United States Patent
Busker et al.

(10) Patent No.: US 11,757,284 B2
(45) Date of Patent: Sep. 12, 2023

(54) METHOD FOR ATTENUATING LOW-FREQUENCY OSCILLATIONS IN AN ELECTRICAL POWER SUPPLY GRID

(71) Applicant: Wobben Properties GmbH, Aurich (DE)

(72) Inventors: Kai Busker, Großefehn (DE); Kaveh Malekian Boroujeni, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/969,460

(22) Filed: Oct. 19, 2022

(65) Prior Publication Data

US 2023/0122376 A1 Apr. 20, 2023

(30) Foreign Application Priority Data

Oct. 20, 2021 (EP) .................................... 21203591

(51) Int. Cl.
 *H02J 3/24* (2006.01)

(52) U.S. Cl.
 CPC ........... *H02J 3/241* (2020.01); *H02J 2300/28* (2020.01)

(58) Field of Classification Search
 CPC .............................. H02J 3/241; H02J 2300/28
 (Continued)

(56) References Cited

U.S. PATENT DOCUMENTS 6,965,174 B2  11/2005 Wobben
9,455,633 B2 * 9/2016 Olea ....................... H02P 9/105
(Continued)

FOREIGN PATENT DOCUMENTS

DE  102018120768 A1  2/2020
EP       3322060 A1  5/2018
(Continued)

*Primary Examiner* — Hal Kaplan
(74) *Attorney, Agent, or Firm* — SEED INTELLECTUAL PROPERTY LAW GROUP LLP

(57) ABSTRACT

A method for attenuating low-frequency oscillations in an electrical power supply grid by means of a feed device which feeds into the electrical power supply grid, in particular a wind power installation, wherein the electrical power supply grid has a grid voltage and a grid frequency, comprising the following steps: picking up a grid signal having the low-frequency oscillations, splitting a total frequency range of the grid signal in which oscillations to be attenuated are to be expected into a plurality of partial frequency ranges, each having a lower and an upper range frequency, performing in each case one frequency analysis of the grid signal for each partial frequency range in order to identify in each case one or more oscillations having an oscillation frequency in the partial frequency range, if present, identifying a low-frequency oscillation to be attenuated as target oscillation depending on the frequency analyses of all of the partial frequency ranges, detecting the target oscillation at least according to frequency and amplitude and optionally according to phase, determining a setpoint attenuation signal depending on the target oscillation detected according to frequency and amplitude and possibly phase for attenuating the detected target oscillation, generating a setpoint feed signal depending on the setpoint attenuation signal and a basic setpoint signal, and generating and feeding in a feed signal depending on the setpoint feed signal (QE).

16 Claims, 7 Drawing Sheets

(58) Field of Classification Search
USPC .......................................................... 307/102
See application file for complete search history.

(56) References Cited

U.S. PATENT DOCUMENTS

| | | | |
|---|---|---|---|
| 11,025,065 B2* | 6/2021 | Maleka | H02J 13/00034 |
| 11,300,101 B2* | 4/2022 | Hovgaard | F03D 9/007 |
| 11,545,832 B2* | 1/2023 | Schwanka Trevisan | H02J 13/00002 |
| 2011/0043952 A1* | 2/2011 | Haussel | H02J 3/24 |
| | | | 324/555 |
| 2013/0176751 A1 | 7/2013 | Olea et al. | |
| 2018/0138709 A1 | 5/2018 | Hamann | |
| 2019/0064232 A1 | 2/2019 | Zhang et al. | |
| 2021/0208186 A1 | 7/2021 | Brombach | |
| 2021/0341523 A1 | 11/2021 | Schwanka Trevisan et al. | |

FOREIGN PATENT DOCUMENTS

| | | |
|---|---|---|
| EP | 3451482 A1 | 3/2019 |
| EP | 3581791 A1 | 12/2019 |
| WO | WO 2005088802 A1 | 9/2005 |
| WO | WO 2017129492 A1 | 8/2017 |
| WO | WO 2020007995 A1 | 1/2020 |

* cited by examiner

METHOD FOR ATTENUATING LOW-FREQUENCY OSCILLATIONS IN AN ELECTRICAL POWER SUPPLY GRID

BACKGROUND

Technical Field

The present invention relates to a method for attenuating low-frequency oscillations in an electrical power supply grid by means of a feed device feeding into the electrical power supply grid, in particular by means of a wind power installation. In addition, the present invention relates to a corresponding wind power installation.

DESCRIPTION OF THE RELATED ART

Wind power installations are known; they feed electrical power into an electrical power supply grid and are often also used for supporting the electrical power supply grid. Thus, it is known, for example, to feed in reactive power depending on the grid voltage of the electrical power supply grid. In particular, in this case a discrepancy between the grid voltage and a rated grid voltage is taken into consideration and, in dependence on this, reactive power is fed in, which can be implemented by changing the phase angle of the feed current. Such a method is known from document U.S. Pat. No. 6,965,174.

Furthermore, so-called subsynchronous oscillations can occur in the electrical power supply grid. These can make themselves noticeable as fluctuations in the voltage amplitudes. Such fluctuations can have frequencies below the rated grid frequency, in particular in the region of a few hertz (Hz) or even having frequencies of below 1 Hz. In particular, in this case electromechanical oscillations are taken into consideration, namely mechanical oscillations of conventional power stations which occur as a result of a fault and lead to electrical oscillations on the grid which bring about a response of other users. These are substantially slow oscillations in the region of 0.1 Hz-1.5 Hz which are considered here. These are in particular inter-area oscillations which are correspondingly slow, namely can reach usually below 1 Hz, rarely up to 1.5 Hz, or as an exception 1.8 Hz.

One problem with such subsynchronous oscillations is that they are difficult to detect. One possibility for the detection consists in the use of a fast Fourier transform, which is known from document US Pat. Pub. No. 2021/0208186.

Such a detection has been proposed for checking for the presence of at least one subsynchronous oscillation over a frequency spectrum which can reach over several decimal powers. The detection of a subsynchronous oscillation is possible in principle with such a method, but the method can have disadvantages for an implementation which also provides for attenuation of such subsynchronous oscillations.

In particular, for the detection in order to provide an attenuation on the basis thereof, a relatively high quality of detection is often required, but without such a large frequency spectrum needing to be covered. In particular, it is possible for not every frequency in which a subsynchronous oscillation can occur to also need to be disruptive. Rather, an attenuation of subsynchronous oscillations can often only be required in a narrowly preset frequency range.

Furthermore, the attenuation of subsynchronous oscillations can be performed by feeding in reactive power. Such an attenuating reactive power feed can possibly collide with an abovementioned voltage-dependent reactive power feed. Thus, it is possible that a voltage-dependent reactive power feed works against a reactive power feed which is intended to attenuate subsynchronous oscillations.

BRIEF SUMMARY

Provided is a method in which subsynchronous oscillations in a relevant frequency range are identified and attenuated, in particular with as little influence as possible on other grid-supporting feeds. At least an alternative solution to previously known solutions is intended to be proposed.

Provided is a method relating to the attenuation of low-frequency oscillations in an electrical power supply grid by means of a feed device which feeds into the electrical power supply grid. Such a feed device may be in particular a wind power installation. However, other decentralized feed devices also come into consideration, for example a feed from an energy store from which a feed takes place by means of a frequency converter. A feed from other energy sources also comes into consideration. In principle, the method is not suitable for directly coupled synchronous generators. The feeding feed devices which can be used here are therefore in particular converter-based feed devices. In particular, so-called full-power converter concepts are proposed in which the total power fed in is passed through a converter arrangement so that the total power fed in can be controlled by the converter arrangement in terms of amplitude, frequency and phase.

An electrical power supply grid which has a grid frequency, in particular conventional 50 Hz or 60 Hz, is assumed. In accordance with one step, it is proposed to pick up a grid signal having the low-frequency oscillations. In particular, a grid voltage is detected in this case. It may of course also arise that it transpires that there are no low-frequency oscillations at all. Potentially, however, this grid signal has the low-frequency oscillations, or at least one.

Then, it is proposed that a total frequency range of the grid signal in which oscillations to be attenuated are to be expected is split into a plurality of partial frequency ranges. Each partial frequency range has a lower, upper and middle range frequency. If, for example, oscillations to be attenuated in a frequency range of 1-5 Hz are to be expected, a partial frequency range can reach from 1 Hz to 3 Hz and can therefore have 1 Hz, 2 Hz and 3 Hz as the lower, middle and upper range frequency. A further partial frequency range can reach from 2 Hz to 4 Hz and can therefore have 2 Hz, 3 Hz and 4 Hz as the lower, middle and upper range frequency. A third partial frequency range can reach from 3 Hz to 5 Hz and can therefore correspondingly have 3 Hz, 4 Hz and 5 Hz as the lower, middle and upper range frequency.

It can be seen from this example that the partial frequency ranges can also overlap one another, but they do not need to overlap one another or can also overlap one another to a relatively small extent.

The middle range frequency can be selected as the arithmetic mean of the lower and upper range frequency.

It is then proposed to perform in each case one frequency analysis of the grid signal for each partial frequency range in order to identify in each case one or more oscillations having an oscillation frequency in the partial frequency range, if present.

Therefore, all of the partial frequency ranges are investigated individually for one or more oscillation frequencies. At this stage, it is often not yet known whether an oscillation is to be expected in the respective partial frequency range at all, and therefore the frequency or amplitude at which it is to be expected is also not known.

If all of the partial frequency ranges have now been investigated in this sense, i.e., all of the oscillations occurring in these partial frequency ranges with their oscillation frequencies have been identified, an overall view is taken.

For this, it is proposed to identify a low-frequency oscillation to be attenuated as target oscillation depending on the frequency analyses of all of the partial frequency ranges. In this case, it has been recognized in particular that a plurality of oscillations having different oscillation frequencies can be identified, but it is not necessarily expedient and/or possible to attenuate all of these oscillation frequencies. In this case, it is possible in particular to select a target oscillation according to the amplitude of the identified oscillations. In addition, a proposed configuration is to pick a possible target oscillation only from oscillations having those oscillation frequencies which are also intended to be attenuated.

It is possible in particular that a frequency range in which oscillations are intended to be attenuated, if they occur, is smaller than the total investigated frequency range. In particular, even the setting of the total frequency range can take place in such a way that it goes beyond such a frequency range in which oscillations are intended to be attenuated. One reason for this consists in that relevant frequencies possibly at the edge of the total frequency range, in particular at the edge of a partial frequency range, can no longer be identified optimally.

In principle, however, it is also not ruled out that more than only one low-frequency oscillation to be attenuated is identified as target oscillation. However, it has been recognized that often only one relevant target oscillation is to be expected, and it is advantageous to concentrate both the detection and the subsequent attenuation on this target oscillation.

Once, therefore, a target oscillation has been identified, this is detected at least according to frequency and amplitude. The identification of the low-frequency oscillation to be attenuated as target oscillation can already include the identification of its frequency. However, this can also mean an inaccurate identification of the frequency of this target oscillation. For this, it is then proposed to detect the target oscillation according to frequency and amplitude in each case as precisely as possible. Optionally, in addition a phase, i.e., phase angle of the target oscillation, can be detected. This can be helpful for the attenuation that is to be performed, but is not absolutely necessary, as can be seen from the text which follows.

It is further proposed to determine a setpoint attenuation signal depending on the target oscillation detected according to frequency and amplitude and possibly also phase in order to attenuate the detected target oscillation. Such a setpoint attenuation signal has in particular itself the frequency of the target oscillation. The setting of a phase of the setpoint attenuation signal is also advantageous in order to then generate a corresponding attenuation signal in accordance with the setpoint attenuation signal which also attenuates the target oscillation and does not excite in the case of false phase angle. Such a phase angle of the setpoint attenuation signal and therefore then also of the attenuation signal does not absolutely need to be set directly dependent on a phase of the detected target oscillation, however. Instead, it is also possible, as will be described in detail later, for the detected target oscillation or a signal derived therefrom to influence the phase angle of the setpoint attenuation signal and therefore of the attenuation signal in another way. In fact, however, it is an option to detect the phase of the target oscillation for this purpose and, in dependence on this, to determine the phase of the setpoint attenuation signal.

However, such a setpoint attenuation signal does not necessarily need to be a sinusoidal signal; one variant consists, however, in the setpoint attenuation signal being sinusoidal.

It is then proposed to generate a setpoint feed signal depending on the setpoint attenuation signal and depending on a basic setpoint signal. The setpoint feed signal is therefore a preset for a feed signal which can in particular be a reactive power to be fed in but can also be an active power or can include an active power. The feed signal is intended to convert the attenuation, but there may be other tasks for the feed signal as well, for example supporting a voltage. These further tasks, or only one further task, are preset by the basic setpoint signal. The provided attenuation and the further tasks are therefore taken into consideration together in the setpoint feed signal and then the feed signal. The setpoint feed signal is then composed in particular of the setpoint attenuation signal and the basic setpoint signal.

One possibility consists in the setpoint attenuation signal or a part thereof being injected onto the basic setpoint signal in order to generate the setpoint feed signal. The feed signal then therefore comprises a basic signal and the attenuation signal. For this, in each case setpoint signals are provided, i.e., the setpoint feed signal for the feed signal, the basic setpoint signal for the basic signal and the setpoint attenuation signal for the attenuation signal.

Finally, the generation and feeding-in of the feed signal take place depending on the setpoint feed signal. This can be performed with the aid of a converter arrangement.

In particular, the attenuation signal can be a reactive power or a reactive current. In addition, even the feeding-in of a reactive power or a reactive current can be provided as basic signal. In this case, it is possible for a voltage-dependent reactive power feed to have already been implemented. Such a voltage-dependent reactive power feed substantially produces a constant reactive power or a constant reactive current when the grid voltage is substantially constant. Such a voltage-dependent reactive power feed responds, depending on the closed-loop control speed, in principle to low-frequency oscillations which have been superimposed on the basic voltage signal with a response which can even result in an impairment, in particular an excitation of the oscillation.

Precisely such low-frequency oscillations, or one of them, are now detected, however, and in particular a target oscillation is identified therefrom. This usually has a comparatively low amplitude or a low oscillation amplitude. Nevertheless, it is relevant to attenuate it before its amplitude becomes greater.

For this purpose, the setpoint attenuation signal is detected and injected onto the basic setpoint signal. The amplitude of the target oscillation can be low in comparison with the amplitude of the grid voltage, i.e., the grid voltage can have a low level of fluctuation, but the derived setpoint attenuation signal can have a significant amplitude which can be of the order of magnitude of the basic setpoint signal, or above. Of course, it may also be lower, which is also dependent on how great in each case one such reactive power which is fed in in voltage-dependent fashion is in order to remain in the case of this example.

Correspondingly, a setpoint feed signal or feed signal is created by this superimposition or it is proposed to generate and feed in the feed signal depending on the setpoint feed signal.

As a result, a feed signal can then be generated and controlled which contains the attenuation signal and also an already existing basic signal. In particular, an attenuating reactive power signal or reactive current signal can be tuned to a voltage-dependent reactive power feed or reactive current feed. This overall view prevents the attenuation signal and the basic signal generated in voltage-dependent fashion working against one another.

In accordance with one aspect, it is proposed that the setpoint attenuation signal describes a reactive power to be fed in, and in particular the basic setpoint signal is preset by power factor correction as setpoint signal for a reactive power to be fed in. The power factor correction can, for example, convert a fixedly preset reactive power setpoint value, but a reactive power feed which is dependent on grid voltage is also possible. Thus, the feed signal then therefore also comprises the reactive power in accordance with setpoint attenuation signal and the reactive power in accordance with basic setpoint signal.

In this case, it has been recognized in particular that the attenuation of the low-frequency oscillation or possibly of a plurality of low-frequency oscillations takes place by means of a corresponding reactive power signal. Therefore, in particular it is possible for a voltage oscillation to be counteracted. A situation whereby the fed-in active power is varied is avoided, and thus mechanical loads of the wind power installation by varying active power provision are avoided. In particular, an oscillating variation in active power can lead to correspondingly oscillating mechanical loads of the generator which can also be transferred to other parts of the wind power installation. It is thus possible, for example, for oscillations of the tower to arise, which is avoided hereby.

In accordance with one aspect, it is proposed that, in order to generate the setpoint feed signal, a core controller is provided which outputs a controller output signal depending on the basic setpoint signal and the fed-in feed signal, and that the setpoint feed signal is determined depending on the controller output signal.

In addition, it is also proposed that the setpoint attenuation signal or a part thereof is injected onto the basic setpoint signal and is thus taken into consideration by the core controller. In addition or as an alternative, it is proposed that the setpoint attenuation signal or a part thereof is injected onto the controller output signal and thus influences the setpoint feed signal.

Therefore, a core controller is provided which can synonymously also be referred to as inner controller or inner control loop. This core controller outputs a controller output signal depending on the basic setpoint signal and the fed-in feed signal. In particular, a setpoint value/actual value comparison between the basic setpoint signal and the fed-in feed signal is formed, and this setpoint value/actual value comparison, i.e., the resultant control error, therefore forms the input signal of the core controller. The output controller output signal then forms the basis for the setpoint feed signal. In the simplest case, the setpoint feed signal corresponds to the controller output signal.

In the aspect in which the setpoint attenuation signal or a part thereof is injected onto the controller output signal, the setpoint feed signal therefore results as the sum of the controller output signal and the setpoint attenuation signal or the part thereof which is injected. This, of course, does not rule out a situation whereby any other supplementary control signals are added. In the simplest and preferred embodiment, the setpoint feed signal in this case, however, results exclusively from the controller output signal and the added setpoint attenuation signal. Since the setpoint attenuation signal can be in particular a sinusoidal signal, it can naturally also be subtracted, depending on the phase angle.

Even in these aspects, provision is made in particular for the basic setpoint signal, the setpoint attenuation signal and correspondingly also the resultant setpoint feed signal to be in each case a setpoint signal for a reactive power.

Thus, the basic setpoint signal can be a reactive power setpoint signal which has been output or preset by a voltage-dependent power factor correction. This basic setpoint signal which would in particular also be preset in the case of deactivated oscillation attenuation by such a voltage-dependent power factor correction is intended to be converted as well as possible with the aid of the core controller. For this purpose, the setpoint value/actual value comparison between the basic setpoint signal and the feed signal, i.e., the actually fed-in reactive power, takes place and results in a control error. Depending on this control error, the core controller outputs the controller output signal.

The controller output signal is then itself again a reactive power setpoint value. Such a core controller, which can be the innermost controller of a corresponding controller cascade, corrects in particular discrepancies which occur owing to the converting converter or are caused by the influence of lines and/or transformers. In particular, transmission lines of a wind power installation to a point of common coupling, particularly when the wind power installation is part of a wind farm, can be relevant here.

In simplified terms, the basic setpoint signal is modified by this core controller in such a way that it compensates for variations by the conversion by converters and influences of lines and transformers. Owing to the use of a controller, the precise dynamics of converters, lines and transformers do not need to be known.

In the case of the voltage-dependent reactive power feed, a situation is thus thereby achieved whereby, despite the discrepancy in the conversion and the transmission, precisely that reactive power which the voltage-dependent power factor correction has initially preset as reactive power setpoint value is fed in.

In addition to such a power factor correction, or other closed-loop control of a basic setpoint signal, there is now the conversion of the setpoint attenuation signal.

In the simplest case, the setpoint attenuation signal is injected onto the basic setpoint signal. The result is compared with the actual value of the feed signal, and the control error thus produced is converted by the core controller into a modified setpoint signal, i.e., into the controller output signal. As a result, injection of the setpoint attenuation signal can be realized in principle in a simple way.

Account should be taken, however, of the fact that the setpoint attenuation signal can in particular be in the form of a sinusoidal signal, and this results in the core controller, which, without this setpoint attenuation signal, is designed substantially for a steady-state signal, continuously needing to adjust an oscillating signal. Owing to the core controller, this can result in a phase shift in this oscillating component since it was originally not designed for correcting such a sinusoidal signal.

It could of course be correspondingly adapted. The correction of a sinusoidal signal, which can in this case have a frequency of a few hertz, can always be problematic, however. In addition, the core controller can have in particular an integral component since it is intended to achieve in particular a steady-state accuracy for the application without an injected sinusoidal attenuation signal. Such an integral component can be unfavorable for the correction of an oscillating signal, however, or can at least not function optimally.

Therefore, one possibility can consist in the setpoint attenuation signal being injected onto the controller output signal, i.e., at the output of the core controller. The core controller can then continue to, i.e., in principle as for the case where no setpoint attenuation signal is injected, correct a steady-state accuracy for the basic setpoint signal. Then, the oscillating setpoint attenuation signal is injected onto the resultant controller output signal, and this setpoint attenuation signal thus does not need to pass through the core controller. Although discrepancies as a result of converters and influences of lines and transformers can then not be corrected for the attenuation signal, this can be acceptable. In particular, frequency position and phase angle are important for the attenuation signal. Any discrepancies in the amplitude are rather of lesser importance. A phase shift can be considered differently, in particular in the generation of the setpoint attenuation signal.

Such a method therefore also functions very well, but it can have a disadvantage. The oscillating attenuation signal injected in this way is namely correspondingly converted so that the fed-in reactive power also has this oscillating component since precisely this is intended to be achieved. This fed-in feed signal, i.e., in particular the fed-in reactive power, with the oscillating component, is fed back, however, to a setpoint value/actual value comparison with the basic setpoint value. As a result, the control error then again does receive an oscillating component and therefore the core controller does have an input signal with an oscillating component.

Depending on the speed and the controller gain, such an influence can be acceptable, however. However, it can also lead to a disruptive oscillating component on the controller output signal. This can then falsify or weaken the attenuation signal injected there at the controller output.

Therefore, in accordance with one aspect, it is proposed that an attenuation compensation signal which is dependent on the setpoint attenuation signal is injected on the input side of the core controller, in particular is injected onto the basic setpoint signal, in order to compensate at least partially for an influence of the setpoint attenuation signal, via the fed-back feed signal, on the core controller.

This is in particular based on the concept of adjusting the detected and fed-back feed signal by the attenuation signal. It is then possible for a setpoint value/actual value comparison between the basic setpoint value and the detected, fed-back feed signal to be performed in which a control error or system deviation which has been adjusted by the attenuation signal results so that a control error which has been adjusted correspondingly by the attenuation signal is input into the core controller. Owing to the linear combination when forming the control error, it is of no importance where precisely the compensation signal component is injected for the adjustment, in particular whether the injection takes place with a corresponding mathematical sign for the adjustment on the basic setpoint value, the fed-back feed signal or on the control error.

Here, in addition, the finding is based on the fact that it is predictable and predeterminable approximately, but not precisely, what kind of oscillation component results from the setpoint attenuation signal on the feed signal. In this case, it is also possible for the mentioned influence of the converter and the lines and transformers to be taken into consideration at least partially. In other words, the oscillating signal which is superimposed on the actually fed-in feed signal is not necessarily identical to the previously injected setpoint attenuation signal. Correspondingly, a signal can be generated which approximately corresponds to the resultant oscillating partial signal superimposed on the feed signal. This is injected onto the fed-back feed signal with the opposite mathematical sign in order thus to compensate substantially for this superimposed partial signal. In the ideal case, a setpoint value/actual value comparison then takes place between the basic setpoint signal and the feed signal adjusted by this superimposed oscillating partial signal.

Of course, it is also possible that such a compensation signal is injected onto the control error for compensation purposes, i.e., after the setpoint value/actual value comparison instead of before the setpoint value/actual value comparison, which leads to the same result given corresponding consideration of the mathematical sign.

In accordance with one aspect, it is proposed that the attenuation compensation signal is injected on the input side of the core controller, which outputs a controller output signal depending on the basic setpoint signal and the fed-in feed signal, in particular is injected onto the basic setpoint signal. In this case, the attenuation compensation signal is generated by filtering out a compensation signal component from the detected feed signal. The compensation signal component has an oscillation frequency of the identified target oscillation, and the attenuation compensation signal is formed depending on the compensation signal component. In particular, the attenuation compensation signal can correspond to the compensation signal component.

The filter is therefore set in such a way that it filters out a signal component having the oscillation frequency of the identified target oscillation. As a result, it is possible to achieve a situation whereby substantially the attenuation signal is filtered out as compensation signal component, but with a different amplitude and phase angle in comparison with the setpoint attenuation signal.

The compensation signal component filtered out in this way can in the ideal case be used directly as attenuation compensation signal. However, an adaptation of the amplitude and/or the phase is also possible when the compensation signal component is converted into the attenuation compensation signal. It is also possible for the injection of the attenuation compensation signal or the further-processing of the compensation signal component to be made dependent on criteria such as an amplitude of the setpoint attenuation signal.

In particular, a bandpass filter can be used to filter out the attenuation compensation signal from the detected feed signal and can be set to the oscillation frequency of the identified target oscillation. The bandpass filter therefore allows substantially only signals with the oscillation frequency of the identified target oscillation to pass through.

In this case, too, the concept is based on adjusting the detected and fed-back feed signal by the attenuation signal.

In accordance with one aspect, it is proposed that at least three overlapping partial frequency ranges are provided. In particular, at least four, at least five or at least six partial frequency ranges are provided.

It has been recognized in particular here that the frequency analysis of the grid signal for each partial frequency range is better the narrower the frequency range is selected to be. In particular, the lower range frequency of each partial frequency range fixes the minimum time period over which the signal needs to be picked up here and evaluated. The lower range frequency therefore limits the speed of the evaluation.

The upper range frequency, however, fixes a minimum scanning frequency, which can also synonymously be referred to as the scanning rate, and in addition even high frequencies should be detected as quickly as possible. The lower and upper range frequency of each partial frequency range therefore contradict one another to a certain extent, and it is therefore proposed to select the partial frequency ranges to be as small as possible. In this case, it has also been recognized that the selection of a relatively small partial frequency range and therefore the use of a relatively large number of partial frequency ranges need not necessarily lead to a correspondingly higher required computation capacity. By good adaptation of the measurement duration and scanning frequency, the computation complexity can be kept correspondingly low.

In accordance with one aspect, it is proposed that the upper range frequency of a partial frequency range is in the region of 1.5 times to 10 times the value of the lower range frequency of the same partial frequency range. In particular, it is proposed that the upper range frequency of a partial frequency range is in the region of twice to three times the value of the lower range frequency of the same partial frequency range. As a result, a good adaptation of the partial frequency ranges can take place. This has in principle the same advantages as have been explained previously in respect of this aspect of providing at least three overlapping partial frequency ranges, in particular at least four, five or six partial frequency ranges.

In particular, it has also been recognized that, even with twice the value of the upper range frequency with respect to the lower range frequency and with a choice of four partial frequency ranges, a frequency spectrum of 1 Hz to 16 Hz, or, for example, of 0.5 Hz to 8 Hz can be covered. In the case of a slight overlap, for example, a range of 0.5-5 Hz can then be covered. In this case, it has also been recognized that, in order to take relevant low-frequency oscillations in the electrical power supply grid into consideration, the coverage of such a frequency range of, for example, 0.5-5 Hz can be sufficient.

In accordance with one aspect, it is proposed that the respective frequency analysis for each partial frequency range uses different time segments of the detected grid signal and has different scanning rates. As a result, the frequency analysis can be adapted well for each partial frequency range. In particular, it is possible to select a time segment to be as small as possible. Such a time segment which is as small as possible is fixed, however, by the lower range frequency of the respective partial frequency range, with the result that the selection of time segments which are as short as possible results in them being different depending on the partial frequency range.

In principle, as high a scanning rate as possible would be desirable. Taking into consideration existing computation capacities in order to also come as quickly as possible to an analysis result, the scanning rate should not be selected to be too high, however. In particular, it is proposed that an identical number of scans are performed for each partial frequency range and therefore for the respective time segment of the detected grid signal which is used as the basis in the relevant partial frequency range. As a result, a relatively low scanning rate results in the case of relatively large time segments, i.e., in the case of partial frequency ranges with relatively low lower range frequencies.

The number of scans per time segment is therefore preferably selected to be in each case identical or similar for the partial frequency ranges. The mentioned advantage results, however, of course not only when this number of scans per time segment is always exactly equal in size.

In particular, it is proposed that a time segment of the grid signal is assigned to each partial frequency range for the evaluation, wherein time segments of a plurality of partial frequency ranges can overlap one another, and the time segment is all the greater the smaller the lower range frequency of the assigned partial frequency range is, and/or a scanning rate which is all the greater the greater the upper range frequency of the partial frequency range is has been assigned to each partial frequency range for performing the frequency analysis. In addition or as an alternative, it is proposed that a number of scans per time segment is used which is identical for different partial frequency ranges, in particular for all of the partial frequency ranges.

A time segment of the grid signal is therefore a segment of the grid signal which is analyzed in each case. It is of different lengths for different partial frequency ranges. The evaluation of the partial frequency ranges takes place, if possible, i.e., also preferably, in an online calculation. Correspondingly, of course, the analysis also takes place in parallel or at the same time for all of the partial frequency ranges. Correspondingly, the respective time segments are of different length, but occur at the same time, in so far as they in any case overlap one another. In particular, the time segments can be realized as sliding windows. Then, the respectively up-to-date time segments of each partial frequency range could have the same end time, which is again continuously renewed. A decisive factor is, therefore, the selection of the length of the time segment. The length of the time segment is oriented therefore on the lower range frequency. As a result, it is possible to achieve a situation whereby, at the same time, updating of the evaluation or calculation is performed for the different partial frequency ranges. From such an update time, the time windows of different lengths reach back to different degrees, with the result that the end times, i.e., usually approximately the present time, are identical, but the start times are different.

The scanning rate can be based on the size of the time segment and in particular can result from the fact that a fixed number of scans is preset per time segment. In addition or as an alternative, the scanning rate can also be based on the upper range frequency, however. In any case, the scanning rate needs to be selected to be so high that even the highest oscillation frequency yet to be analyzed in the respective partial frequency range is scanned at a sufficiently high scanning rate.

In particular, it is proposed that the duration of the time segment of the partial frequency range corresponds at least to half, in particular at least to the whole inverse value of the lower range frequency. In other words, the duration of the time segment of the partial frequency range corresponds at least to half a period duration. It has been recognized that half the period duration of a signal can be sufficient to identify this. In particular, however, it is proposed to use at least a whole period duration in order to be able to apply also standard DFT analyses. In particular, it is proposed to use a DFT for the frequency analysis. As a result, it is possible to select which spectral lines are intended to be calculated/taken into consideration. As a result, expected and/or interesting spectral lines, and therefore frequencies, can be selected in a targeted manner for the consideration.

In addition or as an alternative, it is proposed that the duration of the time segment corresponds at most to five times the inverse value of the lower range frequency. It is therefore proposed to perform the analysis at most over five times the period duration of the longest period. In principle, an analysis can also last longer, but it is necessary to consider that the result of the analysis should be present as early as possible. By selection of a time segment that is too long, an analysis duration that is too long would thus result, which is avoided by the fixing of the upper value of the time segment.

In addition or as an alternative, it is proposed that the scanning rate of in each case one partial frequency range corresponds at least to twice, in particular at least to five times, the upper range frequency. This ensures that, even for signals of the upper range frequency, sufficiently high scanning is performed. A technical lower limit in each case forms a doubled scanning rate of a frequency. However, a substantially improved analysis which achieves sufficient scanning not only in theory but also in practice is achieved by five times the value.

In addition or as an alternative, it is proposed that the scanning rate of in each case one partial frequency range corresponds at most to 100 times, in particular at most to 50 times, the upper range frequency. In principle, the scanning rate could be selected to be as high as desired, but for practical reasons it has been recognized that an excessively high computation power is required for a scanning rate which is too high. In this case, consideration has in particular also been given to the fact that although the scanning rate is based on the upper range frequency, the lower range frequency fixes or influences the measurement duration. In this case, therefore, a solution is proposed in which measurement takes place for a sufficiently long period of time for the lower range frequency, scans take place sufficiently often for the upper range frequency, and all this can also be evaluated in as short a time as possible.

In accordance with one aspect, it is proposed that when, in a first of the partial frequency ranges having a higher upper range frequency than at least one further one of the partial frequency ranges, an oscillation having an oscillation frequency has been identified, this oscillation frequency is considered as potential aliasing frequency. A filtered signal of the grid signal is then used for the frequency analysis of at least one second of the partial frequency ranges having a lower upper range frequency than in the case of the first partial frequency range. Signal components having the aliasing frequency are filtered out from this filtered signal.

Consideration is given here to the fact that the partial frequency ranges can identify oscillations having a different oscillation frequency. If, therefore, an oscillation having a high frequency is identified in a partial frequency range having a high upper range frequency, it nevertheless occurs in partial frequency ranges having a lower upper range frequency since, of course, it occurs in the entire picked-up grid signal. In those partial frequency ranges having a relatively low upper range frequency, under certain circumstances they cannot be identified, however, since the frequency analysis adapted to the respective partial frequency range, in particular the scanning rate, is not designed for such frequencies.

For this reason, such a higher-frequency oscillation in a partial frequency range having a relatively low upper range frequency can result in an aliasing effect. That is to say, it may be that the scanning rate in this partial frequency range having a relatively low upper range frequency is too low to identify this higher-frequency oscillation.

In order to remedy this, such an oscillation having a relatively high oscillation frequency is filtered out in a targeted manner for the analysis of the test signal in partial frequency ranges having a relatively low upper range frequency. It has been recognized here in particular that targeted filtering out of an identified oscillation or frequency can otherwise be performed without the remaining signal being severely influenced. Such a targeted filter falsifies the signal substantially less, therefore, than, for example, a low-pass filter, which generally could filter out any high frequencies.

In accordance with one aspect, it is proposed that, in a first analysis step, the frequency analysis is performed for each partial frequency range in order to identify at least one oscillation having a first frequency. For this purpose, it is further proposed to identify, in a second analysis step, frequency, amplitude and optionally phase of the oscillation identified in the first analysis step by means of a signal investigation which is adapted to the identified oscillation. In particular, it is proposed that the adapted signal investigation of the identified oscillation has a higher resolution than the frequency analysis which has identified the oscillation in the first analysis step and/or has been tuned in a targeted manner to the first frequency identified in the first analysis step.

It has been recognized in particular here that in each case one frequency analysis in a partial frequency range still needs to cover a comparatively large frequency range. In other words, at the beginning it is unclear whether an oscillation is present at all, and if one is present, which frequency it has. It is therefore necessary for the entire frequency range of the respective partial frequency range to be scanned for an oscillation.

For example, in a partial frequency range which reaches from 1 Hz to 2 Hz, an oscillation having a frequency of 1.23 Hz may be present in order to select a simple, illustrative example. The analysis possibly in a first analysis step only results, however, in an oscillation having a frequency of 1.2 Hz being identified. The precise frequency could in this case not yet be identified.

This knowledge of the oscillation having a frequency of approximately 1.2 Hz can then be used for the second analysis step. The analysis is then executed in such a way that it focusses in a targeted manner on the region around 1.2 Hz. It is now already known that an oscillation having a frequency of, for example, below 1.1 Hz and above 1.3 Hz is not present. It is now possible, therefore, to investigate very precisely the oscillation in this frequency range of 1.1 Hz to 1.3 Hz.

In particular, in a thus more precisely delimited frequency range, i.e., in the example in the range of from 1.1 Hz to 1.3 Hz, a higher resolution and/or targeted tuning to this first frequency of 1.2 Hz is performed.

One possibility for such a refinement consists in that an analysis by means of a DFT is performed, and the DFT is repeated after an oscillation frequency has first been narrowed down. In the case of a DFT, spectral lines to be investigated can be selected, and such a selection takes place therefore for the second pass depending on the result of the first investigation.

For example, a window having a duration (window length) of 50s can be used for which 50 points are provided. The length in the case of DFT presets the frequency resolution, i.e., in this case $1/50$ Hz. Therefore, the spectral lines can be calculated with a resolution of $1/50$ Hz up to a maximum frequency, which is dependent on the time resolution. In this example, the following results: 50s/50 points=1s, and therefore 1/1s=1 Hz as the maximum frequency: The investigation can therefore cover a range of DC-1 Hz, with a resolution of 50 values. If, in the first iteration, for example 0.8 Hz occurs, it is not possible initially to get any more precise because the increment is fixed because no new measurement is taken. By means of a further measurement, in particular parallel measurement with a higher resolution, the analysis can then be improved.

One possibility also consists in multiplying the signal to be investigated by a sinusoidal reference signal. In this case, the phase angle of the reference signal is changed by m iterations in a loop in the complete range, i.e., for 0 to 2π or 0° to 360°. Furthermore, the frequency of the reference signal is changed in a further loop by n iterations in the frequency range to be investigated.

Precisely in this case, the increased resolution can begin when, namely, the frequency range to be investigated has been very severely narrowed down owing to the oscillation found in the first analysis step. In the mentioned example, the frequency range has therefore been restricted from initially between 1 Hz and 2 Hz to between 1.1 Hz and 1.3 Hz. In any case, m×n products result. The frequency and the phase angle at which the DC component of the product is at its highest can be assumed to be the frequency and the phase angle of the low-frequency oscillation. If the frequency and the phase angle have been identified, the absolute value of the low-frequency oscillation can also be determined. A calculation can in particular be performed in such a way as is described in the German laid-open specification DE 102018120768 A1, namely in relation to FIGS. 3 and 4, in paragraphs [0059] to [0098].

In accordance with one aspect, it is proposed that, in order to determine the setpoint attenuation signal, an input signal which corresponds to the picked-up grid signal or is derived therefrom is filtered using a bandpass filter. For this purpose, it is further proposed that the bandpass filter is set depending on the identified target oscillation in order to allow, from the input signal, a signal component having the oscillation frequency of the identified target oscillation to pass in order to only allow the target oscillation from the input signal to pass as extracted grid oscillation. For this purpose, it is further proposed to convert the extracted grid oscillation into the setpoint attenuation signal.

In this case, therefore, the concept is based in particular on setting a bandpass filter in a targeted manner on the basis of the identified target oscillation. In this case, the concept is based on the fact that initially direct use continues to be made of the oscillation component of the target oscillation in the grid signal. The bandpass filter which is adapted in a targeted manner therefore filters out, illustratively speaking, everything which does not have the oscillation frequency of the identified target oscillation. The result is then a target oscillation which has been extracted as well as possible from the grid signal and which is converted into the setpoint attenuation signal.

It should be noted that it is advantageous to use an input signal which has been derived from the grid signal instead of the picked-up grid signal. In particular, it is proposed to use a difference between the amplitude of a calculated phasor and a rated voltage value as input signal. For this purpose, the phasor can be calculated from the three conductor-to-ground voltage, and from this the amplitude can be taken. After or as part of such a transformation, the rated voltage, i.e., a fixed value, is then subtracted from the amplitude of the phasor. In this case, the finding is based on the fact that the actual grid voltage signal, i.e., the 50 Hz or 60 Hz signal, dominates in terms of amplitude over the identified target oscillation. By forming the difference in this way, therefore, a very large signal component which, owing to the artificial preset, cannot contain the target oscillation, can already be removed from the grid signal. The input signal generated in this way therefore now has substantially only components which belong to superimposed oscillations.

In any case, on the basis of this a grid oscillation is extracted which has only one oscillation having the one frequency of the identified target oscillation. Of course, a second grid oscillation could also be extracted as well in the same way. Preferably, the method concentrates on extracting a single grid oscillation, however.

The conversion of the grid oscillation into the setpoint attenuation signal is, in the ideal case, when pure reactive power is injected, a gain and a shift through 180°. Preferably, however, it relates in particular to the transformation into the physical unit of the setpoint attenuation signal, i.e., in particular into a setpoint attenuation signal which presets a reactive power to be fed in. In this case, an amplitude of the setpoint attenuation signal can also be set. The conversion can also include providing a phase shift in order that the setpoint attenuation signal or the attenuation signal to be generated actually also attenuates the identified target oscillation and does not amplify it. In this case, the grid oscillation can be standardized in terms of its amplitude with respect to the rated voltage, and the attenuation signal can be standardized with respect to rated reactive power. The gain can also be less than one.

One concept of the proposed solution, i.e., a quite general concept, consists in that it is not the case that a grid oscillation is identified, for example according to frequency, phase and amplitude, and in dependence on this a setpoint attenuation signal is then generated in which likewise again frequency, phase and amplitude are preset, but rather that the extracted grid oscillation, i.e., an extracted grid oscillation signal, is converted directly into the setpoint attenuation signal. The setpoint attenuation signal then therefore also changes immediately when the extracted grid oscillation signal changes. The extracted grid oscillation signal is therefore virtually always generated in up-to-date fashion based on the presently input grid signal.

This has in particular the advantage that the upstream grid oscillation identification in principle results in no delay since it is substantially used for precisely setting the bandpass filter with which ultimately the grid oscillation signal is extracted from the input signal.

Here, the finding is also based on the fact that the target oscillation can change, but that these changes are to be expected to be in terms of amplitude and phase but not in terms of the frequency of the target oscillation. In particular, it has been recognized that such target oscillations, which can therefore in particular be referred to as subsynchronous oscillations, are based on resonance properties which can be affected by physical characteristics, in particular mechanical natural frequencies. These can influence further users, in particular power stations, connected in the electrical power supply grid. As a result, a further excitation or amplification of oscillations can arise. Such a resonance preset physically in principle is generally practically unchangeable in terms of its frequency. Only a hardware change, i.e., for example, changed circuitry in the electrical power supply grid, in particular disconnections and connections of large consumers or generating units, can bring about a change. Amplitudes can, however, change more easily, as well as phase shifts.

This finding is utilized in the proposed solution by virtue of the identification being concentrated on the frequency, the target oscillation thereby being extracted and all of the other properties, in particular amplitude and phase, always being up-to-date owing to the target oscillation extracted in this way and in principle being looped through to the attenuation signal.

In accordance with one aspect, it is proposed that at least one of the following conversion components is used to convert the extracted grid oscillation into the setpoint attenuation signal.

A low-pass filter can be used as a conversion component in order to filter out a noise component from the extracted grid oscillation. The extracted grid oscillation for its part is naturally also a signal which can be referred to synonymously here as grid oscillation signal. Although this grid oscillation signal has, in idealizing fashion, only the target oscillation, in fact noise components can occur, inter alia owing to the signal transmission paths and because filters used do not function ideally. In this case, it should be noted in particular that the extracted grid oscillation signal is intended to be converted into the setpoint attenuation signal. Even small noise components would then result in corresponding components in the setpoint attenuation signal, which should be avoided.

A further possible conversion component is an amplification component for amplifying the extracted grid oscillation. Such an amplification is used not only for ensuring that the setpoint attenuation signal maintains a sufficient amplitude, but also for ensuring that the amplitude of the setpoint attenuation signal, or of an intermediate signal, can be markedly higher than an amplitude of possible disruptive influences.

A high-pass filter is proposed as a further possible conversion component for filtering out low-frequency signal components. In this case, it has been recognized in particular that, in modern electrical power supply grids, wind power installations feed into the electrical power supply grid. These can introduce correspondingly low-frequency voltage fluctuations owing to fluctuations in the wind. In particular, such a high-pass filter comes into consideration for filtering out such low-frequency signal components even when the proposed method is implemented by wind power installations, in particular by a wind farm. Then, such low-frequency signal components which are related to fluctuations in the wind can occur in the grid signal without them occurring in the electrical power supply grid, at least not to a significant degree.

At least one lead-lag filter, which can also be referred to as a lead-lag element, is proposed as a further conversion component. A lead-lag element has a lead element and a lag element, which are connected in series with one another. Such a lead-lag filter is provided for compensating for communications-related delay times. Such communications-related delay times are generally well known, and the lead-lag filter can be set in such a way that it compensates for such delay times. For example, two lead-lag filters can be used: one with a higher-frequency lead element response and one with a higher-frequency lag element response. In the case of a lead-lag element (or lead-lag filter) having a higher-frequency lead element response, the lead-lag element has a lead element response in a higher-frequency range and a lag element response in a range having a lower frequency.

In accordance with one aspect, it is proposed that the determination and/or injection of the setpoint attenuation signal is activated or deactivated depending on a property of the identified target oscillation, in particular depending on an amplitude of the identified target oscillation. In particular, in order to activate an activation threshold and in order to deactivate a deactivation threshold, in each case the target oscillation is provided as comparison value for the amplitude, and the activation threshold is greater than the deactivation threshold.

In this case, it is provided in particular that the identification of the target oscillation remains uninfluenced; only the determination and/or injection of the setpoint attenuation signal is activated or deactivated. The determination of the setpoint attenuation signal can in principle always proceed unchanged since it can be substantially a computer-assisted procedure. In particular, however, the injection of the setpoint attenuation signal can optionally be performed or suppressed or ended.

In this case, it has been recognized in particular that the injection of such a setpoint attenuation signal, in particular the injection of a corresponding reactive power signal, can also have at least a disruptive influence on the remaining operation of the feed device. For example, in the case of an attenuation signal as reactive power, a voltage-dependent reactive power feed is influenced. This should be avoided if the oscillation is small. If, however, the amplitude of the identified target oscillation is sufficiently high, the injection of the setpoint attenuation signal is sensible. A switch-on threshold should, however, be higher than a switch-off threshold, i.e., the activation threshold greater than the deactivation threshold, in order to prevent there being a constant change between activation and deactivation in the case where the target oscillation is approximately in the region of the threshold.

In accordance with one aspect, it is proposed that, in order to inject the attenuation signal, an activation function is generated which ramps up the setpoint attenuation signal to be injected in a controlled manner at the beginning of the injection, in particular ramps it up in accordance with a ramp function. In addition or as an alternative, it is proposed that, in order to end the injection of the attenuation signal, a deactivation function is used which ramps down the injected setpoint attenuation signal in a controlled manner in order to end the injection, in particular ramps it down in accordance with a ramp function.

As a result, discontinuous switching operations are avoided. In particular, the injection of an unfavorable phase angle is also avoided. The setpoint attenuation signal and therefore the attenuation signal results from the extracted grid oscillation signal and can be assumed substantially to be a sinusoidal signal. In principle, it is preset not by parameters but by conversion from the extracted oscillation signal. If the injection of the attenuation signal is now performed without any activation function, this can possibly take place precisely when the sinusoidal attenuation signal currently has a maximum positive or negative amplitude; this would then be injected, which possibly itself could trigger an oscillation. The same applies for the disconnection. Therefore, the virtually soft injection or ending of the injection is proposed.

In accordance with one aspect, it is proposed that, in the case of a plurality of identified oscillations, one is selected as target oscillation, in particular depending on an amplitude, and in particular in such a way that, of a plurality of identified oscillations, that which has the highest amplitude is selected as target oscillation. For this purpose, it is further proposed that the setpoint attenuation signal is generated depending on the selected target oscillation, and, after activation of the determination and/or injection of the attenuation signal, the target oscillation is maintained, and only after a deactivation of the determination or injection is another of the identified oscillations selected as target oscillation.

In this case, the finding is in particular based on the fact that the injection of the attenuation signal is intended also to result in the identified target oscillation being reduced at least in terms of its amplitude. The result could then be that this reduction is successful, and another oscillation therefore has the greatest amplitude and could be selected as target oscillation. Then, however, in the course of the injected attenuation signal, the latter would have to be changed. This is unfavorable for several reasons, however.

Firstly, as a result oscillations can occur, i.e., owing to the switching operation alone. Secondly, it would falsely be concluded from a reduction in the first identified target oscillation that this oscillation has generally become smaller although it has only become smaller as a result of the attenuation. The termination of this attenuation, i.e., by changing to another attenuation of a different oscillation, would therefore allow this first selected target oscillation to be revived immediately, which should be avoided.

If, however, the injection of the attenuation signal has been deactivated, and it then transpires that another target oscillation is greater, the change in the identified target oscillation is then justified and sensible.

In accordance with one aspect, it is proposed that the total frequency range can be preset, and, following presetting of the total frequency range, automatic splitting of the total frequency range into the partial frequency ranges takes place.

In this case, it has been recognized in particular that not only expectable low-frequency oscillations can change, but rather also frequency ranges in which low-frequency oscillations are disruptive to an electrical power supply grid can change or can depend on the electrical power supply grid or can depend on the feed point.

In this case, it is possible in particular for a grid operator to preset the total frequency range, i.e., the range in which it considers low-frequency oscillations to be disruptive and prescribes oscillation suppression there. The presetting of such a total frequency range can also mean that this only takes place rarely or once for a feed device connected to the electrical power supply grid, in particular as long as there is no new preset made by a grid operator. A feed device of identical design, i.e., a wind power installation of identical design, can, however, receive a different preset for the total frequency range in the case of connection to another point of common coupling, in particular on connection to another electrical power supply grid.

The proposed splitting of the total frequency range into the partial frequency ranges can in this case be automated readily by virtue of, for example, magnitude splits of these partial frequency ranges being preset, for example by virtue of the fact that the upper range frequency is always greater than the lower range frequency by a predetermined factor. The upper range frequency can, for example, always be selected to be twice as high as the lower range frequency. Likewise, an overlap can be preset from one partial frequency range to the next, for example in a percentage range. The lower range frequency of a partial frequency range can be, for example, 10% below the upper range frequency of the next lower partial frequency range.

With such presets, it is then easily possible for a preset total frequency range to be automatically split into partial frequency ranges.

In the text above, explanations have in addition already been given in respect of the selection of the time segment to be selected and the scanning rate to be selected, namely depending on lower and upper range frequency of the respective partial frequency range. Therefore, these values can also be derived automatically from the total frequency range which can be preset. The remaining analysis can also be adapted automatically correspondingly. This can take place depending on the identified oscillation frequency. In particular, also adaptive filters can be adapted automatically. In particular, it is proposed for this and for all remaining embodiments to provide the bandpass filter as an adaptive filter. The adaption can take place by virtue of the fact that at least one bandpass frequency is set.

In accordance with one aspect, it is proposed that the feeding of the feed signal takes place by means of a wind farm comprising a plurality of wind power installations, wherein the wind power installations each generate a part of the feed signal, and each wind power installation takes into consideration the same target oscillation for generating the feed signal. In this case, it has been recognized in particular that such a wind farm can perform oscillation attenuation particularly well when all of the wind power installations attenuate the same oscillation.

In particular, in the generation of such attenuation signals, which can be time-critical, there is the need to generate such attenuation signals as synchronously as possible and of course in a similar way in order that they also superimpose one another to form a total attenuation signal. Central coordination of such an attenuation signal by a farm controller can be problematic owing to necessary quick cross-farm communication. In particular, the central presetting of a setpoint attenuation signal by a farm controller can run into communication limits within the wind farm.

The proposed solution avoids this problem, alleviates it at least. There is central control to ensure that all of the wind power installations use the same target oscillation. This target oscillation, in particular its frequency, can then be used in particular for the bandpass filter. This can take place individually in each wind power installation, and also the further signal processing can take place individually in each wind power installation, with the result that no great communications resources are required within the wind farm.

In the case of sufficient communications resources, however, it is also possible that an extracted grid oscillation or a corresponding extracted grid oscillation signal is provided centrally in the farm for all of the wind power installations. A converted setpoint attenuation signal also naturally comes into question as the central signal which a farm controller distributes to all of the wind power installations if the communication in the farm allows this.

In accordance with the invention, a wind power system is also proposed which comprises one or more wind power installations. The wind power system can therefore be a wind power installation or the wind power system can be a wind farm having a plurality of wind power installations. The wind energy system has, for this purpose, at least one measuring sensor for picking up a grid signal having the low-frequency oscillations, and the wind power system has at least one control device which is set up to perform a method for attenuating low-frequency oscillations. The control device can also have an inverter or an inverter arrangement or converter arrangement for feeding electrical power and therefore also for feeding reactive power into the electrical power supply grid.

In accordance with one aspect, the wind power system is set up to implement a method in accordance with one of the above-described embodiments or aspects. In particular, the control device is set up to perform the method. In particular, the measuring sensor can also be part of the control device. When the measuring sensor is not part of the control device, the control device is in particular set up to implement the method steps which the measuring sensor does not implement.

BRIEF DESCRIPTION OF THE SEVERAL VIEWS OF THE DRAWINGS

The invention will now be explained in more detail below using embodiments by way of example with reference to the accompanying figures.

DETAILED DESCRIPTION

Figure 1:
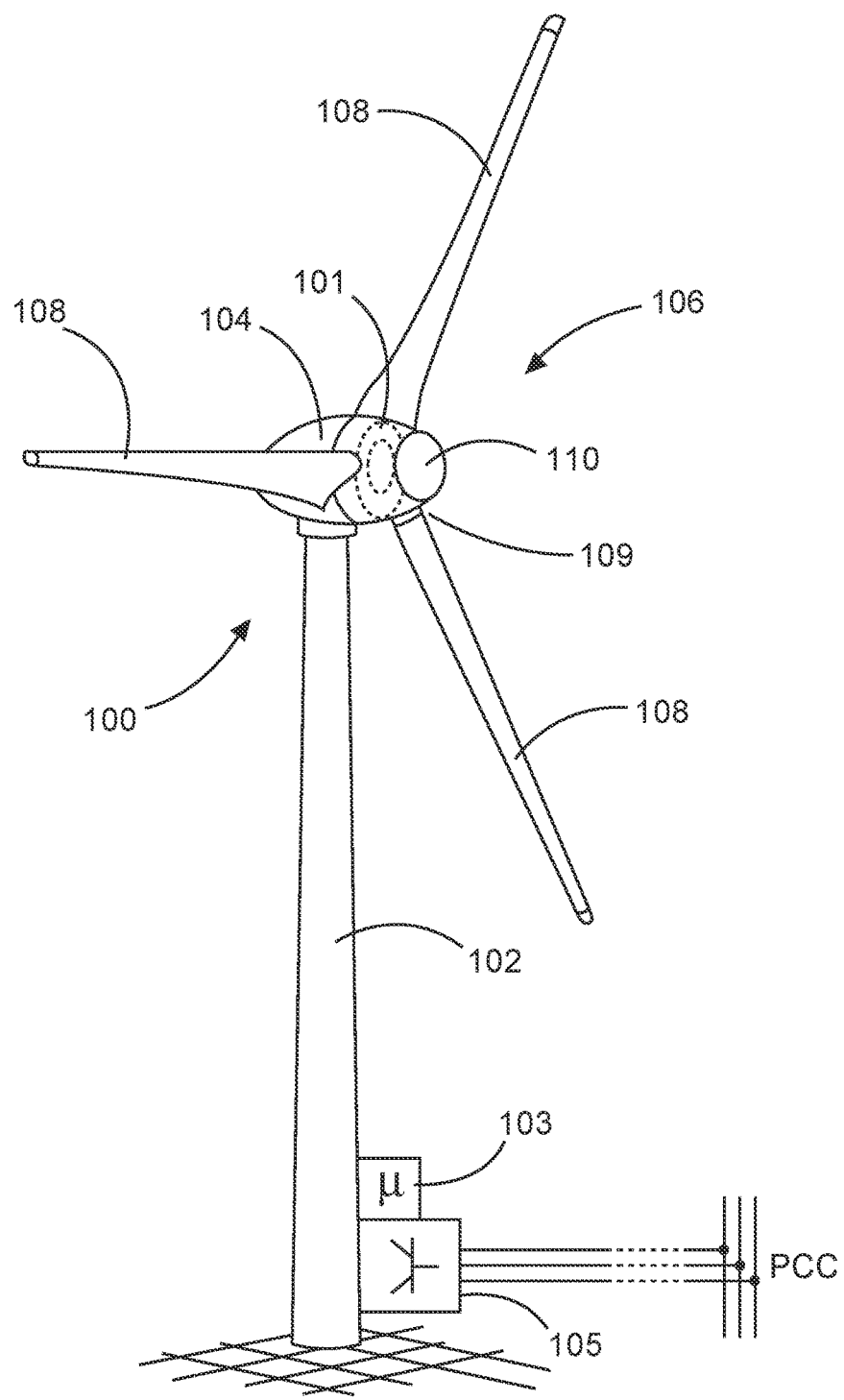
FIG. 1 shows a wind power installation in a perspective illustration.

FIG. 1 shows a schematic illustration of a wind power installation in accordance with the invention. The wind power installation 100 has a tower 102 and a nacelle 104 on the tower 102. An aerodynamic rotor 106 having three rotor blades 108 and a spinner 110 is provided on the nacelle 104. The aerodynamic rotor 106 is set in rotary motion by the wind during operation of the wind power installation and therefore also rotates an electrodynamic rotor of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 109 of the respective rotor blades 108.

The wind power installation 100 in this case has an electric generator 101, which is shown within the nacelle 104. Electrical power can be generated by means of the generator 101. In order to feed in electrical power, a feed unit 105 is provided which can in particular be in the form of an inverter. Thus, a three-phase feed current and/or a three-phase feed voltage can be generated according to amplitude, frequency and phase for feeding in at a point of common coupling PCC. This can take place directly or else together with other wind power installations in a wind farm. In order to control the wind power installation 100 and also the feed unit 105, an installation controller 103 is provided. The installation controller 103 can also receive preset values from the outside, in particular from a central farm computer.

Figure 2:
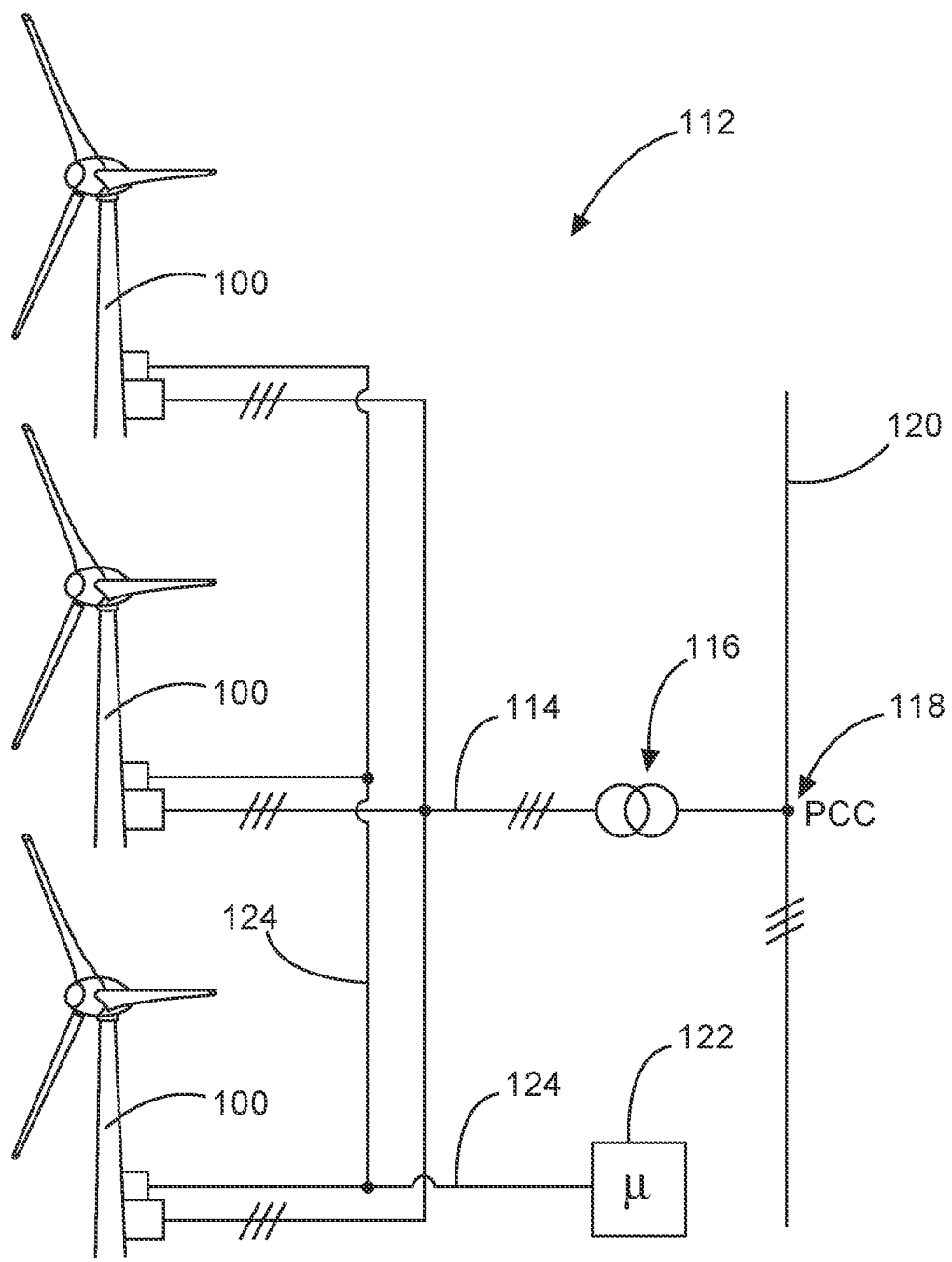
FIG. 2 shows a wind farm in a schematic illustration.

FIG. 2 shows a wind farm 112 having, by way of example, three wind power installations 100, which can be identical or different. The three wind power installations 100 are therefore representative of in principle any desired number of wind power installations of a wind farm 112. The wind power installations 100 provide their power, namely in particular the generated current, over an electrical farm grid 114. In this case, the respectively generated currents or powers of the individual wind power installations 100 are added up, and usually a transformer 116 is provided which steps up the voltage in the farm in order to then feed it into the power supply grid 120 at the feed point 118, which is also referred to generally as PCC. FIG. 2 is only a simplified illustration of a wind farm 112. It is possible for the farm grid 114 to have a different configuration by virtue of, for example, a transformer also being provided at the output of each wind power installation 100 in order to name but one other exemplary embodiment.

The wind farm 112 in addition has a central farm computer 122, which can also be referred to synonymously as central farm controller. This can be connected to the wind power installations 100 via data lines 124 or wirelessly in order to thereby exchange data with the wind power installations and in particular to receive measured values from the wind power installations 100 and to transmit control values to the wind power installations 100.

Figure 3:
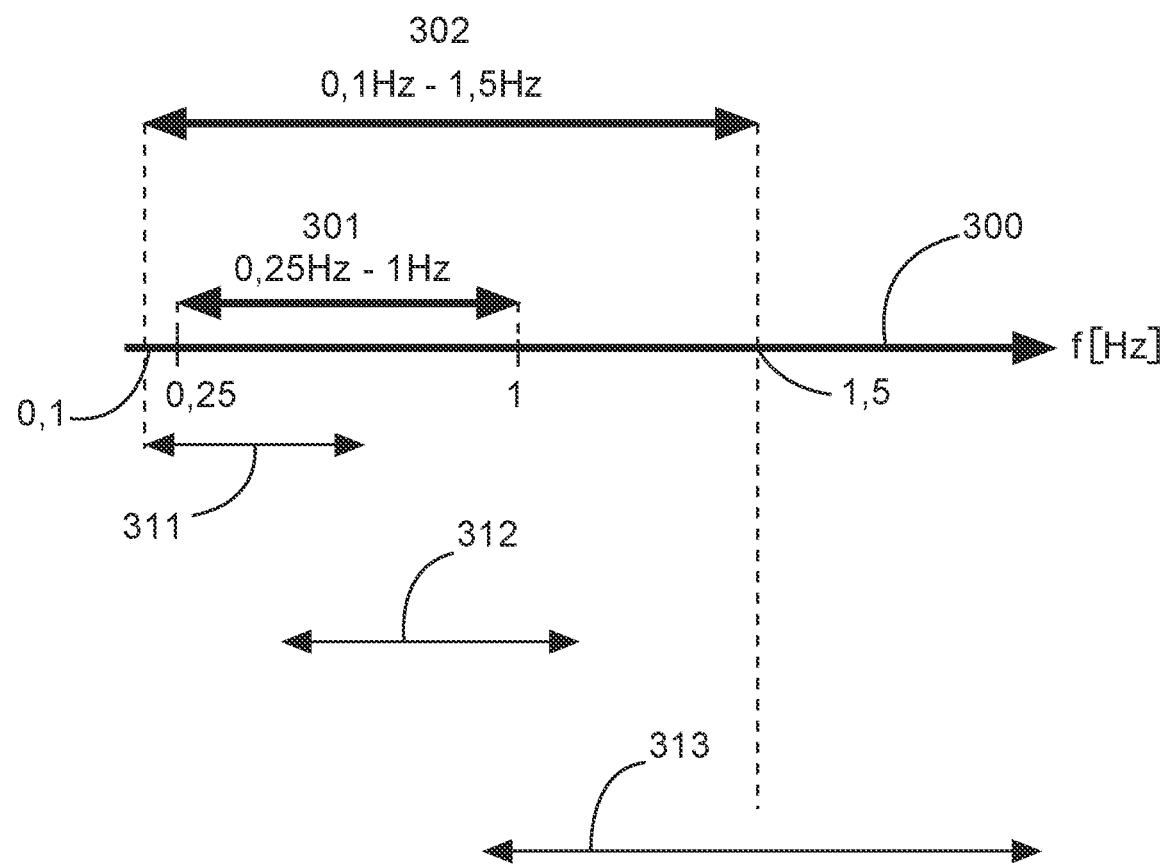
FIG. 3 shows a graph for a possible frequency splitting.

FIG. 3 shows a graph for illustrating possible frequency splits with a frequency ray 300 on which possible oscillation frequencies are plotted in Hz.

By way of example, a first frequency range 301 and a second frequency range 302 are illustrated. These first and second frequency ranges 301 and 302 characterize ranges in which the detection and attenuation of a low-frequency oscillation is of interest. Such frequency ranges can vary depending on the electrical power supply grid or grid section of an electrical power supply grid.

In order to detect at least one low-frequency oscillation, splitting into a plurality of in particular overlapping partial frequency ranges is proposed. FIG. 3 shows for this, by way of example, a first, second and third partial frequency range 311, 312 and 313.

The first two partial frequency ranges 311 and 312 cover the first frequency range 301, and all three partial frequency ranges 311 to 313 cover the second frequency range 302. However, it is also possible for all three partial frequency ranges 311 to 313 to be used for detecting a low-frequency oscillation for the first range 301. If, in this case, a low-frequency oscillation is detected outside of the first range 301, this can be discarded or does not need to be taken into consideration any further.

For the exemplary three partial frequency ranges 311 to 313 shown in FIG. 3, in each case different time windows are provided for the detection, and at the same time different resolutions are provided. The number of scans per window, and therefore per analysis, can be identical, however. For the first partial frequency range 311, a time window having a length of 25 seconds and a resolution of 0.5 second is provided. For the second partial frequency range 312, a time window having a length of 12.5 seconds and a resolution of 0.25 second is provided. For the third partial frequency range 313, a time window having a length of 5 seconds and a resolution of 0.1 second is provided.

Therefore, it is possible in particular for a relatively short time window to be provided for ranges having a relatively high frequency in order to thus also detect a low-frequency oscillation correspondingly quickly. Varying the resolution additionally makes it possible for there to be no need for an excessively large computation capacity, which would be the case if the resolution of a small time window for a high frequency range were to be maintained in the case of a long time window for a low frequency range. The proposed solution avoids this.

Figure 4:
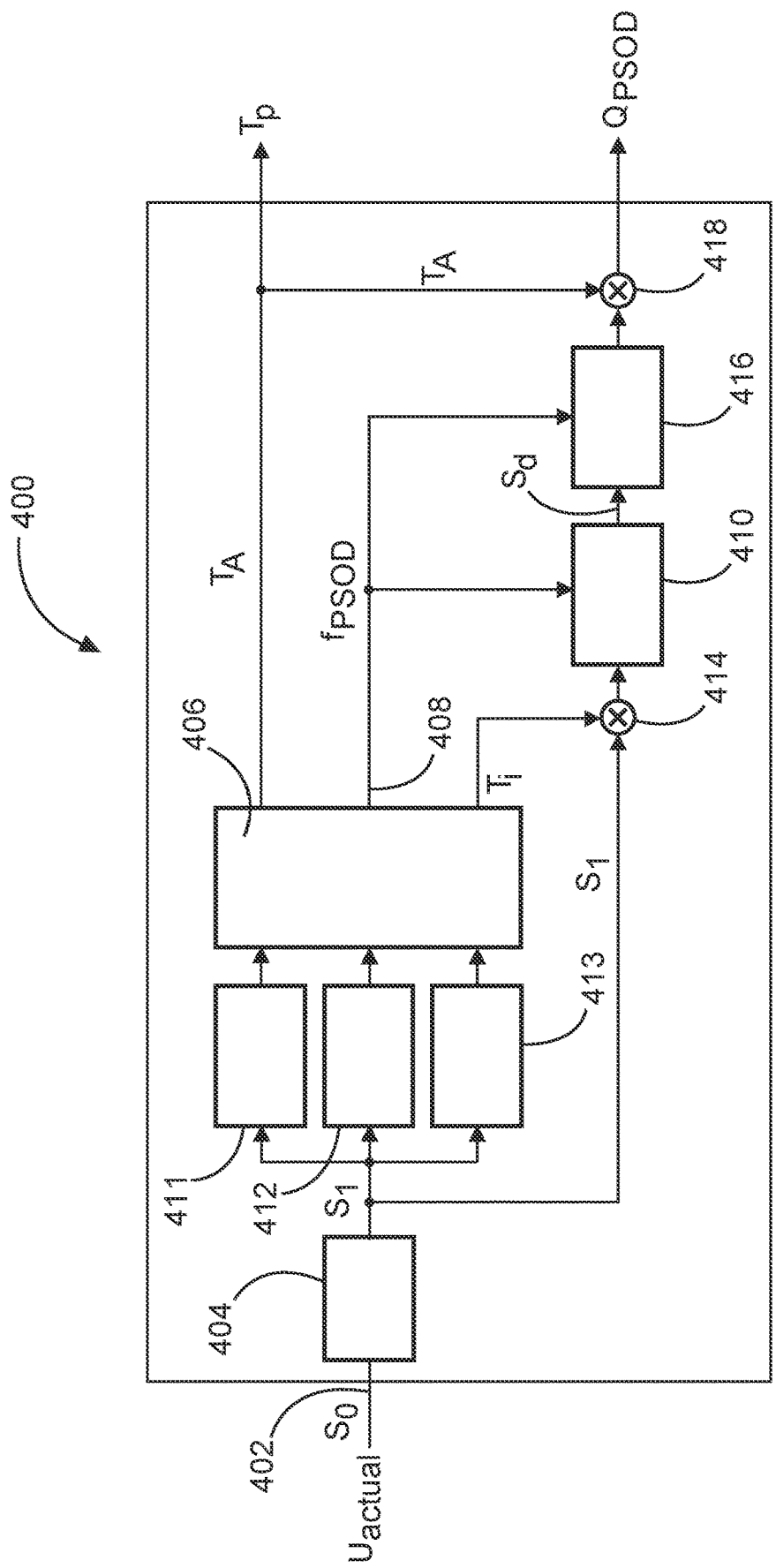
FIG. 4 shows a closed-loop attenuation control structure for determining a setpoint attenuation signal.

FIG. 4 shows a closed-loop attenuation control structure 400 for determining a setpoint attenuation signal for attenuating a low-frequency oscillation.

For this purpose, the closed-loop attenuation control structure 400 has a signal input 402 at which the grid voltage or a grid signal having the low-frequency oscillations is input. It is therefore possible for the grid voltage to be directly detected and input there, i.e., a picked-up grid signal. Preferably, the grid voltage is picked up by the detection of three conductor-to-ground voltages of the three-phase system. From this, a phasor is calculated, and of this phasor only the amplitude is taken into consideration. The rated voltage, i.e., a fixed value, can be subtracted from the amplitude of this phasor. Then there remains only a difference between the amplitude of the phasor and the fixed grid voltage value. This difference can be input at the signal input 402.

This difference is therefore an input signal or grid signal which still has the low-frequency oscillations since only a constant value was subtracted. This input signal is then passed via the signal process block 404, which can perform a first filtering in order to filter out in particular a measurement noise. The signal process block 404 can therefore have in particular low-pass responses.

Therefore, a prefiltered or preprocessed signal $S_1$ is output at the output of the signal process block 404 and input into one of the analysis blocks 411 to 413. Preferably, a grid fault, for example a voltage dip, can be identified in the signal process block 404, or in another component. If a grid fault is identified, a signal detected prior to the grid fault or a signal or value representative thereof, such as, for example, a mean value, can be used during the grid fault instead of the detected or measured signal. This relates in particular to a very short grid fault in the range of 100 to 500 ms. In this case, it has been recognized in particular that the proposed attenuation of oscillations is usually important after a grid fault. By virtue of the proposed bypassing of the voltage dip during the measurement, it is possible to achieve a situation whereby good detection of the low-frequency oscillation is present quickly after the fault.

In order to identify low-frequency oscillations in the prefiltered signal $S_1$, therefore, a plurality of analysis blocks is provided, namely in this case a first, second and third analysis block 411, 412 and 413, respectively. Each of these three analysis blocks performs a frequency analysis in each case for one partial frequency range. For this purpose, each of the three analysis blocks 411 to 413 has a dedicated time window and a dedicated resolution. This could take place, for example, for three different partial frequency ranges 311 to 313 having the corresponding window lengths and resolutions, as has been explained in FIG. 3.

The result of each of the three analysis blocks 411 to 413 can be an identified low-frequency oscillation. However, it is naturally also possible for in each case no low-frequency oscillation to be present, and therefore also that no such oscillation can be identified. It is also possible that in each case a plurality of low-frequency oscillations is identified in one or more of the analysis blocks.

In a case which is also used for explanatory purposes here, in each case one low-frequency oscillation is detected in each of the three analysis blocks 411 to 413. The respective analysis block 411 to 413 outputs frequency and amplitude for each detected low-frequency oscillation and passes these values on to a coordination unit 406.

In the coordination unit 406, these identified low-frequency oscillations are evaluated. First, an evaluation is performed to ascertain whether they are in the frequency range under consideration at all. If, therefore, for example with reference to FIG. 3, a low-frequency oscillation is in the region of 1.2 Hz but only the first frequency range 301 is relevant, which reaches only from 0.25 to 1 Hz, this low-frequency oscillation is discarded or not take into any further consideration.

Of the remaining low-frequency oscillations, one is identified as target oscillation and only this one is then taken into consideration any further. It is possible in particular for that low-frequency oscillation which has the greatest amplitude of all of the identified and relevant low-frequency oscillations to be considered as target oscillation. However, it is also possible for another or a further criterion to be considered. For example, a quotient of amplitude and oscillation frequency can be formed for each low-frequency oscillation, and the low-frequency oscillation with the largest quotient calculated hereby can be identified as the target oscillation, in order to name a further example.

It is naturally also possible for all three analysis blocks 411 to 413, which is also representative of a different number of analysis blocks, to identify in total only one single low-frequency oscillation which then therefore automatically forms the target oscillation.

Of the thus identified target oscillation, its oscillation frequency is output as oscillation frequency $f_{PSOD}$ of the low-frequency oscillation to be attenuated at the frequency output 408. This frequency $f_{PSOD}$ can be referred to simply as attenuation frequency $f_{PSOD}$.

This attenuation frequency $f_{PSOD}$ is then input into a bandpass filter block 410. The bandpass filter block 410 is then set corresponding to the input attenuation frequency $f_{PSOD}$, namely in particular in such a way that the attenuation frequency $f_{PSOD}$ forms the bandpass filter frequency.

The bandpass filter block 410, which has now been set to the attenuation frequency $f_{PSOD}$, can therefore receive the prefiltered signal $S_1$ as input signal. For this purpose, the coordination unit 406 can output an initialization trigger Ti, which namely then has the value 1. Therefore, the prefiltered signal $S_1$ is multiplied by the initialization trigger Ti in the input multiplier 414. The prefiltered signal $S_1$ is therefore as a result passed through to the bandpass filter block 410. In particular, provision is made for the initialization trigger Ti to only be able to assume the values 0 or 1. Prior to the initialization, the coordination unit 406 therefore only outputs the value 0 as initialization trigger Ti.

The prefiltered signal $S_1$ is then passed through the bandpass filter block 410 and it naturally also has the low-frequency oscillation identified as dominant. The bandpass filter block 410 or the bandpass filter implemented therein is now precisely adapted to the dominant low-frequency oscillation to be attenuated, which results in that, of the prefiltered signal $S_1$ which initially still has all of the frequency components, now only the target oscillation to be attenuated is passed through, and everything else is filtered out. The bandpass filter block 410 therefore outputs the oscillation signal Sd to be attenuated and in the process passes it on to the determination controller block 416.

The determination controller block 416 converts the oscillation signal Sd to be attenuated into a setpoint attenuation signal $Q_{PSOD}$.

The determination controller block 416 can in this case change in particular amplitude and phase of the oscillation signal Sd to be attenuated and possibly perform further conversions such as filtering. Details in this regard are explained below with reference to FIG. 5, which in principle shows the inner structure of the determination controller block 416.

The setpoint attenuation signal $Q_{PSOD}$ is intended to be injected onto a further signal for the attenuation in order to generate thereby a setpoint feed signal which contains this setpoint attenuation signal. Details in this regard are described further below. First, provision is made, however, for the setpoint attenuation signal $Q_{PSOD}$ generated by the determination controller block 416 to be capable of being ramped up slowly in terms of its amplitude for activation purposes, in particular from zero. For this purpose, an output multiplier 418 is provided. The setpoint attenuation signal $Q_{PSOD}$ can be multiplied in the output multiplier 418 by a value which can increase from 0 to 1, for example as a ramp. Such a value can be output by the coordination unit 406 as output trigger $T_A$. This output trigger $T_A$ can also be output as output trigger $T_A$ in order to then be used as activation indicator in subsequent closed-loop control structures.

The closed-loop attenuation control structure 400 therefore receives an input signal $S_0$ which is representative in principle of the entire grid voltage signal, and in dependence thereon the closed-loop attenuation control structure 400 outputs the setpoint attenuation signal $Q_{PSOD}$ in addition to the output trigger $T_A$, which can act as activation indicator.

Figure 5:
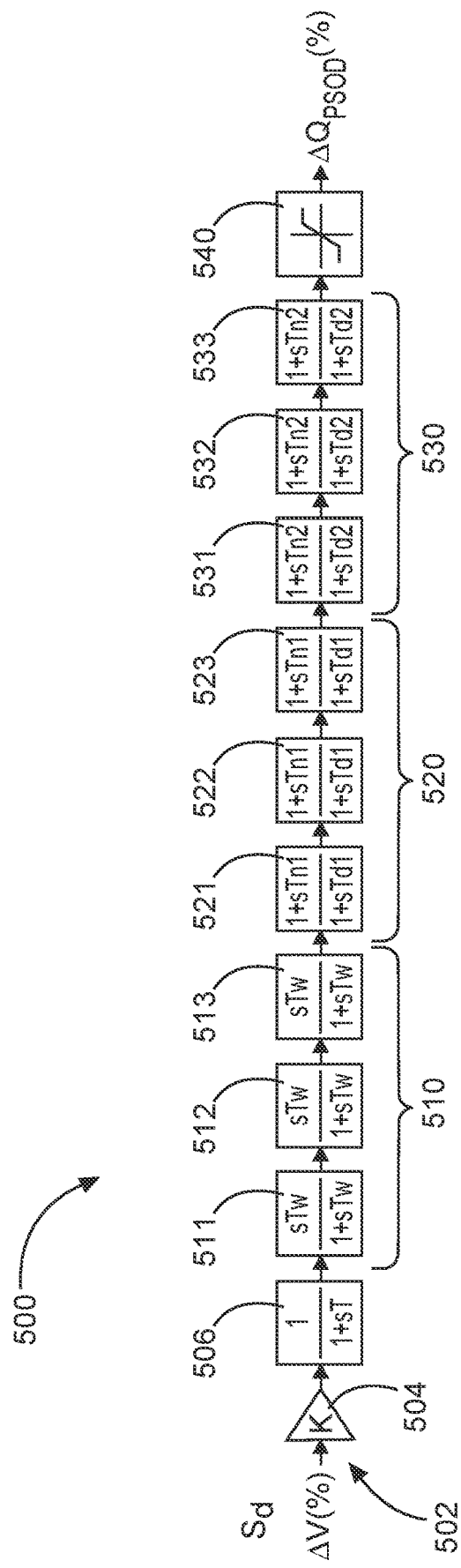
FIG. 5 shows a structure comprising conversion components as part of the closed-loop control structure shown in FIG. 4.

FIG. 5 shows a structure comprising conversion elements, of which many can also be referred to as filters, which can be contained in the determination controller block 416. The oscillation signal Sd to be attenuated can be input at the converter input 502 of the converter structure 500. It is possible for in this case only the standardized differential voltage to be input, for example as a percentage value based on the rated voltage. The voltage difference is therefore, as has been explained above, the amplitude of the phasor, which is calculated from the three voltage values of the three phases, minus the value of the rated voltage. The rated voltage can correspond to 100%.

This input signal can first be given via an amplification element 504 in order to amplify it. A low-pass filter element 506 can follow, which can further reduce a still remaining noise component.

Further components which follow can each comprise a plurality of individual elements. FIG. 5 shows in this regard three examples each having three elements. However, it is also possible for in each case more or in particular fewer elements to be provided. In addition, reference is made to the fact that if the components are linear, they can also be arranged in a different order than that illustrated. Taking into consideration calculation which is not infinitely precise and signal rendering which is not infinitely precise, however, the proposed order can be advantageous.

Following on from the low-pass filter element 506 there is a high-pass filter component 510, which in this case is composed of three high-pass filter elements 511 to 513. The high-pass filter component 510 is provided for the purpose of filtering out low-frequency signal components which are still remaining from the oscillation signal to be attenuated. Such low-frequency signal components can occur in particular owing to feeding wind power installations due to fluctuations in the wind.

Both high-frequency noise components which are filtered out by the low-pass filter element 506 and low-frequency signal components which are filtered out by the high-pass filter component 510 have naturally also already been filtered out by the bandpass filter block 410 in FIG. 4. Since filters rarely function ideally, in particular are rarely exactly selective, however, such signal components can nevertheless also be present after the filtering by the bandpass filter block 410.

The low-pass filter element 506 and the high-pass filter component 510 are tuned to the attenuation frequency $f_{PSOD}$. Therefore, this attenuation frequency $f_{PSOD}$ is input into the determination controller block 416 and can therefore be taken into consideration in this converter structure 500 in FIG. 5. The low-pass filter element 506, the high-pass filter component 510 and the lead-lag components or lead-lag elements yet to be explained below are likewise set depending on the attenuation frequency $f_{PSOD}$.

The low-pass filter element 506 is set in such a way that its fundamental is above the attenuation frequency $f_{PSOD}$. The high-pass filter component 510 or the high-pass filter elements 511 to 513 is/are set in such a way that its/their fundamental(s) is/are below the attenuation frequency $f_{PSOD}$.

The high-pass filter component 510 is followed by a first lead-lad filter component 520, which is composed of three individual lead-lag filter elements 521 to 523. Owing to the use of a plurality of filter elements, in this case, therefore, the three lead-lag filter elements 521 to 523, a higher degree of selectivity can be achieved. This also applies to the high-pass filter component 510 and also the second lead-lag filter component yet to be described below.

By means of a lead-lag filter, signal shifts can be achieved which are frequency-dependent. Thus, in particular the oscillation signal to be attenuated, in particular after the described further filtering which further works out this oscillation signal to be attenuated, can be correspondingly shifted. As a result, communications-related delay times can be compensated for.

A lead-lag filter, which can also be referred to as a lead-lag element, can be realized by virtue of the fact that at least one filter element or filter component is in the form of a lead element or lead component and a further filter component or filter element is in the form of a lag filter or lag element.

Furthermore, a second lead-lag filter component 530 can be provided which is likewise composed of three lead-lag filter elements 531 to 533. It is also possible for the first lead-lag filter component 520 to function substantially as the lead component in the frequency range in question, whereas the second lead-lag filter component 530 functions substantially as the lag component in the frequency range in question.

Finally, a limitation element 540 is also provided with which possibly a limitation of the generated signal can be performed. As a result, it is possible to avoid a situation whereby, as a result of the processing using the various filter components, an undesirably high signal amplitude occurs. Such an undesirably high signal amplitude can also occur when the oscillation signal to be attenuated has a correspondingly high amplitude. Although generating a corresponding setpoint attenuation signal which likewise has a high amplitude would on its merits be appropriate, it can have problems in terms of its implementation, with the result that this limitation is provided.

Therefore, a setpoint attenuation signal $\Delta Q_{PSOD}$ is output by the converter structure 500 which can likewise be output as a percentage value. By way of reference, in this case a maximum reactive power value of the feed device can be used which can correspond in terms of magnitude to the rated power of the feed device. The designation with the Greek letter $\Delta$ indicates that this setpoint attenuation signal is intended to be injected onto an existing signal. It can correspond to the setpoint attenuation signal $Q_{PSOD}$, in particular after multiplication by the activation trigger $T_A$ at the output multiplier 418.

In particular, provision is made here for a corresponding reactive power signal to be determined as setpoint attenuation signal and for the components or elements in the determination controller block 416 or the converter structure 500 to be adapted thereto.

Figure 6:
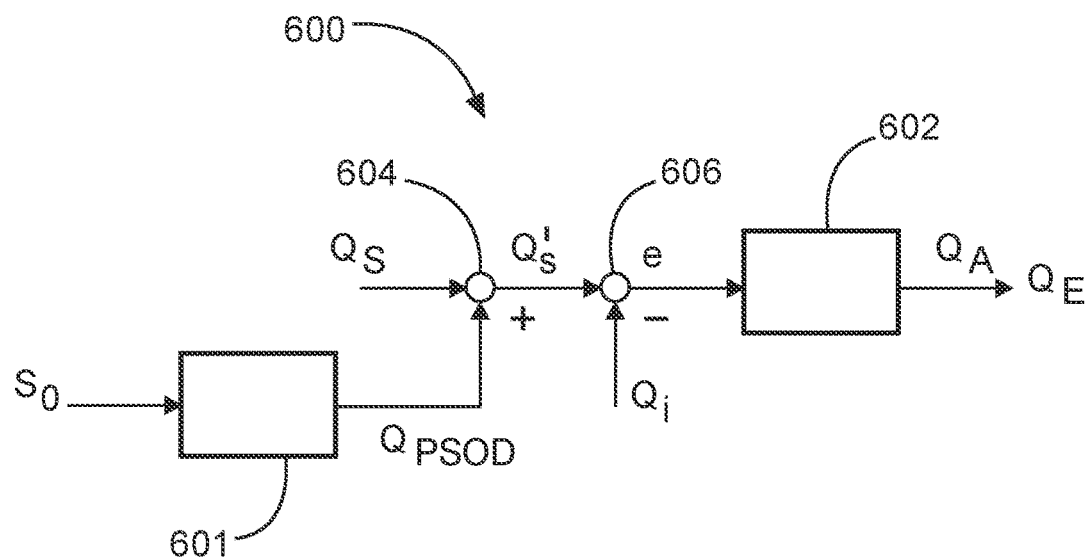
FIGS. 6 to 8 show alternative total closed-loop control structures for injecting a setpoint attenuation signal.
Figure 7:
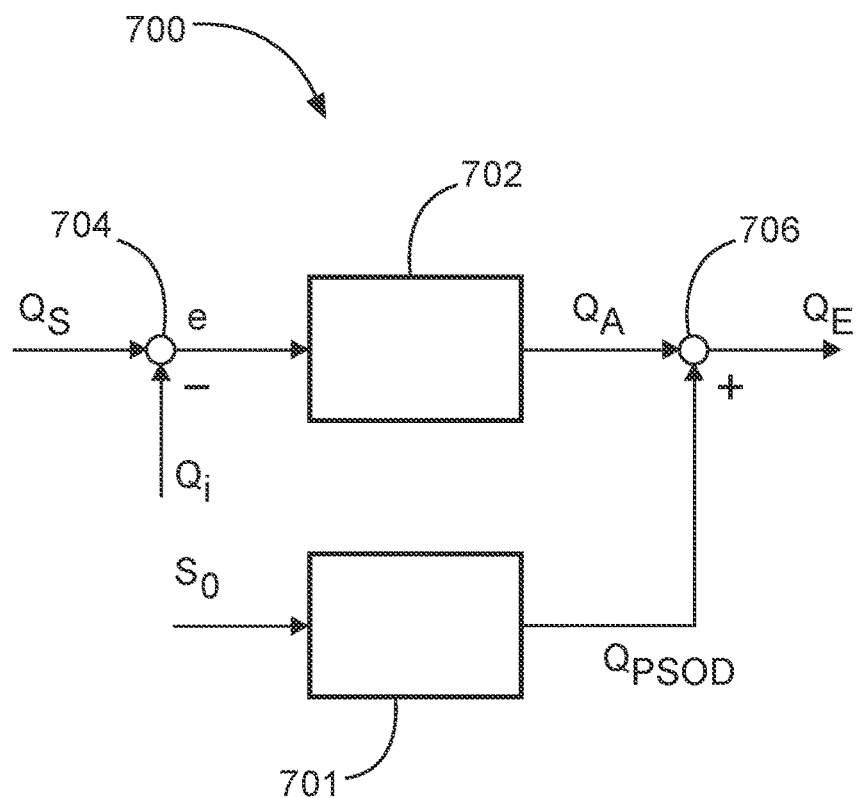
Figure 8:
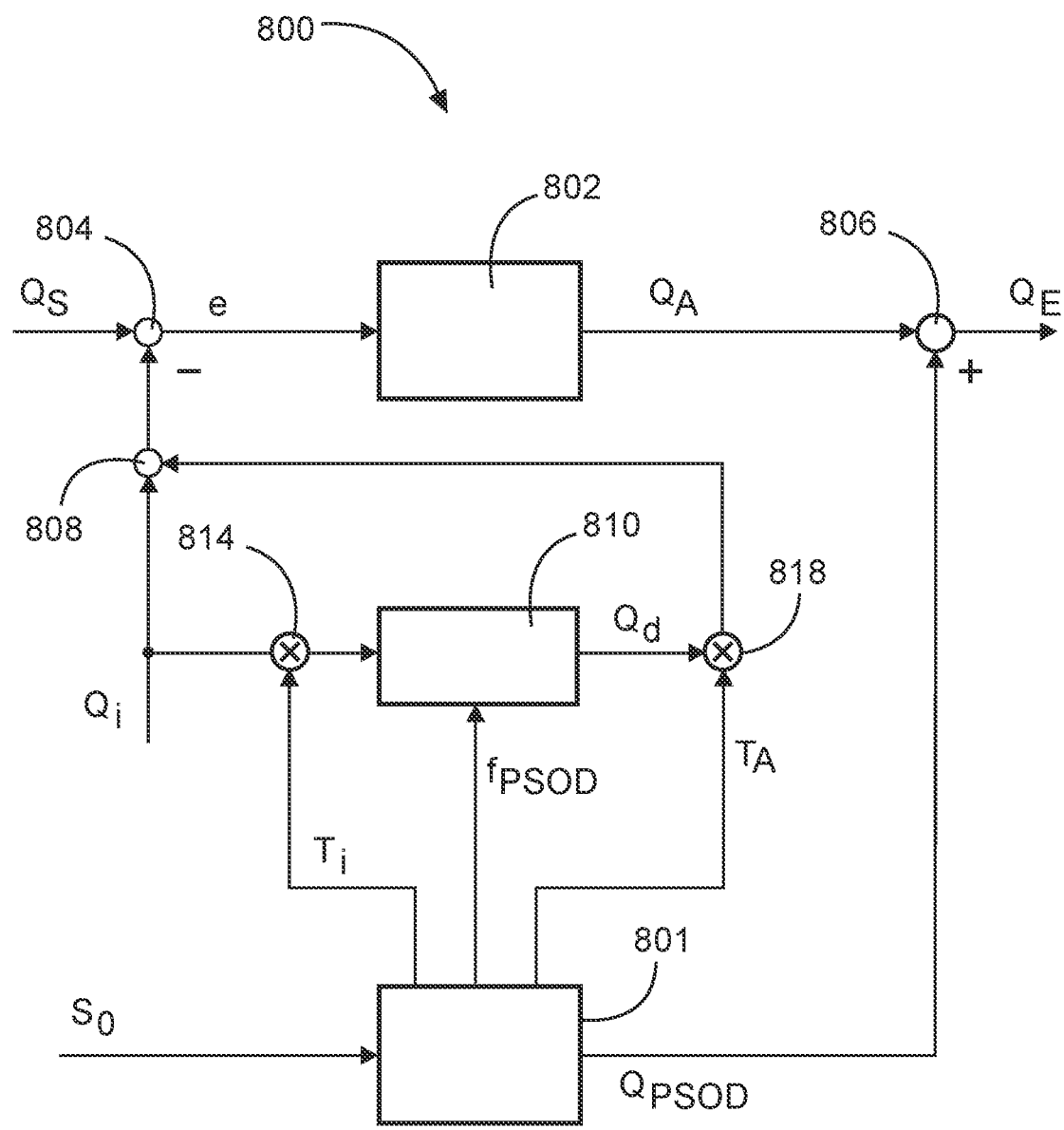

FIGS. 6 to 8 show alternative structures for generating a setpoint feed signal depending on a basic setpoint signal and depending on a setpoint attenuation signal. All three structures in FIGS. 6 to 8 build upon a structure having a core controller 602, 702 and 802, respectively. Such a core controller is provided for converting a basic setpoint signal which still does not have a setpoint attenuation signal.

In this case, the basic setpoint signal is a basic reactive power setpoint signal. This basic reactive power setpoint signal $Q_S$ is intended, at least as long as there is no consideration of a setpoint attenuation signal, to be fed in as feed signal, and for this purpose, the core controller generates a controller output signal $Q_A$. Without taking into consideration the setpoint attenuation signal, this can correspond to a setpoint feed signal $Q_E$. For this purpose, the core controller receives, as input signal, a control error e (can also synonymously be referred to as system deviation) as a result of a setpoint value/actual value comparison between the basic reactive power setpoint signal $Q_S$ and an actually fed-in reactive power signal Qi. Deviations between the basic reactive power setpoint signal $Q_S$ and the actually fed-in reactive power signal Qi, i.e., the actual value, can result in particular owing to the response of the feed unit, i.e., in particular an inverter arrangement, and possibly further electrical components such as inductors, transformers and transmission lines.

For the additional feeding-in of the setpoint attenuation signal or of an attenuation signal corresponding to the setpoint attenuation signal, FIG. 6 provides a total structure 600 in which the setpoint attenuation signal $Q_{PSOD}$ is injected onto the basic reactive power setpoint signal $Q_S$ at a first summation element 604. A modified basic reactive power setpoint signal $Q_S'$ results, and, in addition, the control error e is formed at the second summation element 606. The control error e is then input into the core controller 602 as previously.

The setpoint attenuation signal is generated by the attenuation controller 601, which can substantially correspond to the closed-loop attenuation control structure 400 in FIG. 4. Correspondingly, the attenuation controller 601 also receives an input signal $S_0$, which can correspond to the input signal $S_0$ in FIG. 4.

FIG. 6 therefore shows a simple variant in which there is the problem that the previous core controller 602 needs to also take into consideration this additional setpoint attenuation signal. Often, such a core controller 602 is provided for the conversion of a substantially constant reactive power setpoint signal, i.e., basic reactive power setpoint signal $Q_S$, and therefore is not necessarily provided for the correction of an oscillating setpoint signal. However, if this core controller 602 is quick enough, i.e., is designed to be quick enough, and/or the oscillation to be attenuated is slow enough or a correspondingly slow oscillation to be attenuated is expected, the structure in FIG. 6 can be used.

FIG. 7 shows, as an alternative, a total structure 700 in which the setpoint attenuation signal $Q_{PSOD}$ is injected onto the controller output signal $Q_A$ downstream of the core controller 702 at a second summation element 706. This results directly in the setpoint feed signal $Q_E$. In this case, too, an attenuation controller 701 is provided, which can correspond substantially to the closed-loop attenuation control structure 400 in FIG. 4 and can also receive the same input signal $S_0$.

Likewise, a first summation element 704 is provided in the total structure 700 in FIG. 7, said first summation element forming a control error e, namely from the difference between the basic reactive power setpoint signal $Q_S$ and the fed-in reactive power actual value Qi. However, this results in the effect that an injected attenuation signal appears again in the control error e and is fed in in superimposed fashion on the basis of the setpoint attenuation signal. By injecting the setpoint attenuation signal $Q_{PSOD}$ at the second summation element 706, the fed-in reactive power deviates from the basic reactive power setpoint value $Q_S$ by this setpoint attenuation signal $Q_{PSOD}$ owing to the modified setpoint feed signal $Q_E$. The fed-in reactive power actual value Qi is thus correspondingly changed. This can result in the core controller 702 attempting to correct this varying control error thus resulting. If, however, the core controller 702 is sufficiently slow in comparison with the oscillation signal Sd to be attenuated and therefore in comparison with the setpoint attenuation signal $Q_{PSOD}$, this simple total structure 700 can be suitable or at least sufficient.

An improvement can be achieved, however, via the total structure 800 in FIG. 8. The total structure 800 in principle provides for the setpoint attenuation signal $Q_{PSOD}$ to be injected onto the controller output signal $Q_A$ at a second summation element 806 in order thus to obtain the setpoint feed signal $Q_E$. In addition, provision is made for the fed-in reactive power actual value Qi to be adjusted by the attenuation signal fed in in accordance with the setpoint attenuation signal. As a result, it is possible to achieve a situation whereby the core controller 802 neither needs to convert the setpoint attenuation signal as well nor is influenced thereby in the control error e.

For this purpose, provision is made in principle for the fed-in reactive power actual signal Qi to be passed via a bandpass filter 810. The bandpass filter 810 can correspond to the bandpass filter block 410 in FIG. 4 and also receives the attenuation frequency $f_{PSOD}$ as input value, namely from the attenuation controller 801, which can substantially correspond to the closed-loop attenuation control structure 400. The bandpass filter 810 filters a compensation signal component out of the detected feed signal, i.e., out of the reactive power actual signal Qi. The compensation signal component in the ideal case corresponds at least in terms of its frequency to an attenuation signal Qd corresponding to the setpoint attenuation signal $Q_{PSOD}$. However, it is influenced by the response of the feed device, in particular a converter arrangement, and possibly further components such as inductors, transformers and transmission lines. The attenuation signal Qd therefore actually corresponds imprecisely to the setpoint attenuation signal $Q_{PSOD}$, with the result that the setpoint attenuation signal $Q_{PSOD}$ can also not simply be used for the adjustment.

In any case, the compensation signal component thus generated, as attenuation compensation signal, is subtracted from the reactive power actual signal Qi in a third summation element 808.

In idealizing fashion, therefore, a reactive power signal adjusted by the attenuation signal Qd remains and is subtracted from the basic reactive power setpoint signal $Q_S$ in the first summation element 804 in order thus to form the control error e, which has therefore been correspondingly adjusted by the attenuation signal Qd.

In accordance with the closed-loop attenuation control structure 400, the generation or output of the setpoint attenuation signal $Q_{PSOD}$ is dependent on the initialization trigger Ti and the activation trigger $T_A$. This initialization or activation is therefore accordingly also implemented in the total structure 800 by an input multiplier 814 and an output multiplier 818. In other words, the adjustment of the reactive power actual signal Qi at the third summation element 808 is inactive even when no setpoint attenuation signal $Q_{PSOD}$ at all is generated or output.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
attenuating low-frequency oscillations in an electrical power supply grid by a feed device which feeds into the electrical power supply grid, wherein the electrical power supply grid has a grid voltage and a grid frequency, wherein the low-frequency oscillations are less than 5 hertz, the attenuating comprising:
detecting a grid signal having the low-frequency oscillations,
splitting a total frequency range of the grid signal in which oscillations to be attenuated are to be expected into a plurality of partial frequency ranges, each partial frequency range having a lower range frequency and an upper range frequency,
performing a frequency analysis of the grid signal for each partial frequency range to identify in each case one or more oscillations having an oscillation frequency in the partial frequency range, if present,
identifying a low-frequency oscillation to be attenuated as a target oscillation depending on the frequency analyses of all of the plurality of partial frequency ranges,
detecting the target oscillation at least according to frequency and amplitude,
determining a setpoint attenuation signal depending on the target oscillation detected according to frequency and amplitude for attenuating the detected target oscillation,
generating a setpoint feed signal depending on the setpoint attenuation signal and a basic setpoint signal, and
generating and feeding in a feed signal depending on the setpoint feed signal.

2. The method as claimed in claim 1, wherein:
the setpoint attenuation signal describes a reactive power to be fed in, and
the basic setpoint signal is preset by power factor correction as a setpoint signal for a reactive power to be fed in.

3. The method as claimed in claim 1, wherein:
to generate the setpoint feed signal, a core controller is provided which outputs a controller output signal depending on the basic setpoint signal and the fed-in feed signal,
the setpoint feed signal is determined depending on the controller output signal, and
the setpoint attenuation signal is:
injected onto the basic setpoint signal and taken into consideration by the core controller, and/or
injected onto the controller output signal and influences the setpoint feed signal, and/or wherein an attenuation compensation signal, which is dependent on the setpoint attenuation signal, is injected on an input side of the core controller, and is injected onto the basic setpoint signal to at least partially compensate for an influence of the setpoint attenuation signal, via the fed-back feed signal, on the core controller.

4. The method as claimed in claim 3, wherein:
the attenuation compensation signal is injected on the input side of the core controller, and the fed-in feed signal is injected onto the basic setpoint signal,
the attenuation compensation signal is generated by filtering out a compensation signal component from the detected feed signal,
the compensation signal component has an oscillation frequency of the identified target oscillation,
the attenuation compensation signal is formed depending on the compensation signal component, and
to filter out the attenuation compensation signal from the detected feed signal, a bandpass filter is used and set to the oscillation frequency of the identified target oscillation.

5. The method as claimed in claim 1, wherein:
at least three overlapping partial frequency ranges are provided,
the upper range frequency of a partial frequency range is in a region of 1.5 times to 10 times a value of the lower range frequency of the same partial frequency range,
the respective frequency analysis for each partial frequency range uses different time segments of the detected grid signal and has different scanning rates,
a time segment of the grid signal is assigned to each partial frequency range for the evaluation, wherein time segments of a plurality of partial frequency ranges overlap one another, and
a scanning rate has been assigned to each partial frequency range for performing the frequency analysis, and/or
a number of scans per time segment is used which is identical for different partial frequency ranges,
the duration of the time segment of the partial frequency range corresponds at least to half inverse value of the lower range frequency, and/or corresponds at most to five times the inverse value of the lower range frequency, and/or
the scanning rate of, in each case, one partial frequency range corresponds to at least twice the upper range frequency, and/or
the scanning rate of, in each case, one partial frequency range corresponds up to one hundred times the upper range frequency.

6. The method as claimed in claim 1, wherein:
when, in a first of the partial frequency ranges having a higher upper range frequency than a further one of the partial frequency ranges, an oscillation having an oscillation frequency has been identified,
the oscillation frequency of the identified oscillation is considered as potential aliasing frequency, and
for the frequency analysis of at least a second of the partial frequency ranges having a lower upper range frequency than in a case of the first partial frequency range, a filtered signal of the grid signal is used from which signal components having the aliasing frequency are filtered out.

7. The method as claimed in claim 1, wherein:
in a first analysis step, the frequency analysis is performed for each partial frequency range to identify at least one oscillation having a first frequency,
in a second analysis step, frequency, amplitude, and phase of the oscillation are identified by a signal investigation which is adapted to the identified oscillation, and
the adapted signal investigation of the identified oscillation has a higher resolution than the frequency analysis and/or has been tuned in a targeted manner to the first frequency identified in the first analysis step.

8. The method as claimed in claim 1, wherein:
to determine the setpoint attenuation signal, an input signal which corresponds to the picked-up grid signal or is derived therefrom is filtered using a bandpass filter,
the bandpass filter is set depending on the identified target oscillation to allow, from the input signal, a signal component having the oscillation frequency of the identified target oscillation to pass to only allow the target oscillation from the input signal to pass as extracted grid oscillation, and
converting the extracted grid oscillation into the setpoint attenuation signal.

9. The method as claimed in claim 8, wherein:
to convert the extracted grid oscillation into the setpoint attenuation signal, at least one conversion element is used from the list comprising:
  a low-pass filter for filtering out a noise component,
  an amplifying element for amplifying the extracted grid oscillation,
  a high-pass filter for filtering out low-frequency signal components which occurs in the case of feeding wind power installations as a result of fluctuations in the wind, and
  at least one lead-lag filter for compensating for communications-related delay times.

10. The method as claimed in claim 1, wherein:
the determination and/or injection of the setpoint attenuation signal is activated or deactivated depending on a property of the identified target oscillation depending on an amplitude of the identified target oscillation,
to activate, an activation threshold, and to deactivate, a deactivation threshold, is provided in each case as a comparison value for the amplitude of the target oscillation, and
the activation threshold is greater than the deactivation threshold.

11. The method as claimed in claim 1, wherein:
to inject the attenuation signal, an activation function is generated which ramps up the setpoint attenuation signal to be injected in a controlled manner at the beginning of the injection, and/or
to end the injection of the attenuation signal, a deactivation function is used which ramps down the injected setpoint attenuation signal in a controlled manner in order to end the injection.

12. The method as claimed in claim 1, wherein:
in the case of a plurality of identified oscillations, one is selected as a target oscillation depending on an amplitude in such a way that, of a plurality of identified oscillations, that which has the highest amplitude is selected as target oscillation,
the setpoint attenuation signal is generated depending on the selected target oscillation, and
after the activation of the determination and/or injection of the attenuation signal, the target oscillation is maintained, and only after a deactivation of the determination or injection is one of the identified oscillations selected as target oscillation.

13. The method as claimed in claim 1, wherein:
the total frequency range is preset, and
the splitting the total frequency range into the plurality of partial frequency ranges occurs after presetting of the total frequency range.

14. The method as claimed in claim 1, wherein:
the feeding in the feed signal comprises using a wind farm comprising a plurality of wind power installations,
each of the plurality of wind power installations generates a part of the feed signal, and
each of the plurality of wind power installations takes into consideration the same target oscillation for generating the feed signal.

15. The method as claimed in claim 1, wherein the detecting the target oscillation is further according to a phase, wherein the determining the setpoint attenuation signal further depends on the phase.

16. A wind power system, comprising:
one or more wind power installations configured to:
  perform a method for attenuating low-frequency oscillations in an electrical power supply grid, wherein the electrical power supply grid has a grid voltage and a grid frequency, comprising:
    a measuring sensor for picking up a grid signal having the low-frequency oscillations, and
  a controller configured to;
    split a total frequency range of the grid signal in which oscillations to be attenuated are to be expected into a plurality of partial frequency ranges, each having a lower, an upper, and a middle range frequency,
    perform in each case one frequency analysis of the grid signal for each partial frequency range to identify in each case one or more oscillations having an oscillation frequency in the partial frequency range, if present, perform the identification of a low-frequency oscillation to be attenuated as a target oscillation depending on the frequency analyses of all of the partial frequency ranges,
    perform a detection of the target oscillation at least according to frequency and amplitude and optionally according to phase,
    perform a determination of a setpoint attenuation signal depending on the target oscillation detected according to frequency and amplitude and possibly phase for attenuating the detected target oscillation,
    perform a generation of a setpoint feed signal depending on the setpoint attenuation signal and a basic setpoint signal, and
  perform a generation and feed a feed signal depending on the setpoint feed signal.

* * * * *